United States Patent
Zhu et al.

(10) Patent No.: US 8,711,722 B2
(45) Date of Patent: Apr. 29, 2014

(54) METHOD FOR PROCESSING POWER HEADROOM AND TERMINAL THEREOF

(75) Inventors: Peng Zhu, Shenzhen (CN); Peng Hao, Shenzhen (CN); Bin Yu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/259,486

(22) PCT Filed: Aug. 18, 2010

(86) PCT No.: PCT/CN2010/076117
§ 371 (c)(1),
(2), (4) Date: May 21, 2012

(87) PCT Pub. No.: WO2011/097878
PCT Pub. Date: Aug. 18, 2011

(65) Prior Publication Data
US 2012/0294167 A1 Nov. 22, 2012

(30) Foreign Application Priority Data
Feb. 10, 2010 (CN) .......................... 2010 1 0111052

(51) Int. Cl.
*G01R 31/08* (2006.01)
(52) U.S. Cl.
USPC .......................................... 370/252; 370/329
(58) Field of Classification Search
None
See application file for complete search history.

(56) References Cited

U.S. PATENT DOCUMENTS

| | | | | |
|---|---|---|---|---|
| 2010/0158147 A1* | 6/2010 | Zhang et al. | ................... | 375/260 |
| 2010/0232373 A1* | 9/2010 | Nory et al. | ................... | 370/329 |
| 2011/0038271 A1* | 2/2011 | Shin et al. | ................... | 370/252 |

FOREIGN PATENT DOCUMENTS

| | | |
|---|---|---|
| CN | 101340622 | 1/2009 |
| CN | 101715207 | 5/2010 |
| CN | 101778416 | 7/2010 |
| WO | WO-2008/055235 | 5/2008 |
| WO | WO-2008/155469 | 12/2008 |

OTHER PUBLICATIONS

Catt, "Considerations on uplink power control in LTE-Advanced," 3GPP TSG RAN WG1 meeting #59bis. (2010).
Potevio, "Uplink power control for carrier aggregation in LTE-Advanced," 3GPP TSG RAN WG1 meeting #59bis. (2010).
Ericsson et al., "Uplink power control for carrier aggregation," 3GPP TSG RAN WG1 meeting #58bis. (2009).
ZTE, "Considerations on scheduling in carrier aggregation," 3GPP TSG RAN WG2 meeting.#66bis. (2009).
Samsung, "Correction on PHR triggering condition," 3GPP TSG-RAN2#64 meeting. (2008).
Extended European Search Report corresponding to European Application No. 10845548.6 dated Jun. 25, 2013.

* cited by examiner

*Primary Examiner* — David Oveissi
(74) *Attorney, Agent, or Firm* — Vincent K. Gustafson; Jenkins, Wilson, Taylor & Hunt, P.A.

(57) ABSTRACT

The invention discloses a method for processing power headroom and a terminal thereof, wherein the method comprises: when transmitting a physical uplink shared channel (PUSCH) and/or a physical uplink control channel (PUCCH) on subframe i and component carrier group j, the terminal measures power headroom on the subframe i and the component carrier group j; the terminal reports the power headroom to the base station and indicates the type of the reported power headroom when reporting. The invention specifically indicates the type to which the power headroom belongs by reporting the type while reporting the power headroom, thereby avoiding confusion.

19 Claims, 2 Drawing Sheets

METHOD FOR PROCESSING POWER HEADROOM AND TERMINAL THEREOF

CROSS-REFERENCE TO RELATED APPLICATIONS

This application is the national phase of PCT application PCT/CN2010/076117 having an international filing date of 18 Aug. 2010, which claims benefit of Chinese application No. 201010111052.8 filed 10 Feb. 2010. The contents of the above patent applications are incorporated by reference herein in their entirety.

TECHNICAL FIELD OF THE PRESENT INVENTION

The invention relates to the field of communication, and specifically to a method for processing power headroom and a terminal thereof.

BACKGROUND OF THE PRESENT INVENTION

In the 3rd generation partnership project long term evolution (3GPP LTE) system, the uplink power control is used for controlling the transmission power of the uplink physical channel, so as to compensate the path loss and shadow fading of the channel, and suppress inter-cell interference. The uplink physical channels controlled by the uplink power control comprise the physical uplink shared channel (PUSCH), the physical uplink control channel (PUCCH) and sounding reference signal (SRS). The uplink power control of LTE adopts the combined control mode of open loop and closed loop.

In the LTE system, the transmission power of PUSCH of user equipment (UE) on the subframe i is defined as:

$$P_{PUSCH}(i) = \min\{P_{CMAX}, 10\log_{10}(M_{PUSCH}(i)) + P_{O\_PUSCH}(j) + \alpha(j) \cdot PL + \Delta_{TF}(i) + f(i)\}[dBm]$$

in which, $P_{CMAX}$ is the configured maximum UE output power, the range of which is jointly determined by the maximum UE power determined by the UE power class, the IE P-Max configured by system, the configured maximum output power tolerance ($P_{CMAX}$ tolerance), and the maximum power reduction (MRP) and the additional maximum power reduction (A-MPR) which are caused by the operation frequency band, the system bandwidth, the modulation order, the transmission bandwidth position, the transmission bandwidth configuration and so on;

$P'_{PUSCH}(i)) = 10\log_{10}(M_{PUSCH}(i)) + P_{O\_PUSCH}(j) + \alpha(j) \cdot PL + \Delta_{TF}(i) + f(i)$ is the transmission power of PUSCH which is estimated by the UE according to the open loop and closed loop power control parameters and instructions of base station, the path loss estimate, and the number of resource blocks of PUSCH sent on the subframe i;

$M_{PUSCH}(i)$ is the bandwidth of PUSCH transmission on the subframe i, which is represented by the number of resource blocks (RBs);

$P_{O\_PUSCH}(j)$ is an open loop power control parameter, which is the sum of a cell specific value $P_{O\_NOMINAL\_PUSCH}(j)$ and a UE specific value $P_{O\_UE\_PUSCH}(j)$; in which, j=0 corresponds to the semi-persistent scheduled PUSCH transmission, j=1 corresponds to the dynamic scheduled PUSCH transmission, and j=2 corresponds to the random access response scheduled PUSCH transmission (the PUSCH transmission scheduled by the random access response);

$\alpha$ is the cell specific path loss compensation factor. When j=0 or 1, $\alpha(j) \in \{0, 0.4, 0.5, 0.6, 0.7, 0.8, 0.9, 1\}$, and when j=2, $\alpha(j)=1$. $\alpha=1$ is the complete path loss compensation, and $\alpha<1$ is the partial path loss compensation;

PL is the downlink path loss estimate which is measured and computed at UE;

$\Delta_{TF}(i)$ is a power offset related to the modulation coding scheme (MCS); and f(i) is the current power control adjustment state of PUSCH. According to the configuration of higher layer parameter, in the case of the accumulated value power control, $f(i)=f(i-1)+\delta_{PUSCH}(i-K_{PUSCH}))$ and in the case of the absolute value power control, $f(i)=\delta_{PUSCH}(i-K_{PUSCH})$. $\delta_{PUSCH}$ is a UE specific closed loop correction value, which is also called transmission power control (TPC) command.

In the LTE system, the transmission power of PUCCH of UE on the subframe i is defined as:

$$P_{PUSCH}(i) = \min\{P_{CMAX}, P_{0\_PUCCH} + PL + h(n_{CQI}, n_{HARQ}) + \Delta_{F\_PUCCH}(F) + g(i)\}[dBm]$$

in which, the definition of $P_{CMAX}$ is same as what mentioned above;

$P'_{PUCCH}(i) = P_{0\_PUCCH} + PL + h(n_{CQI}, n_{HARQ}) + \Delta_{F\_PUCCH}(F) + g(i)$ is the transmission power of PUCCH which is estimated by the UE according to the open loop and closed loop power control instructions of base station, the path loss estimate, and the PUCCH format sent on the subframe i;

$P_{O\_PUCCH}$ is an open loop power control parameter, which is the sum of a cell specific value $P_{O\_NOMINAL\_PUCCH}$ and a UE specific value $P_{O\_UE\_PUCCH}$;

$\Delta_{F\_PUCCH}(F)$ is a power offset related to the PUCCH format (F), which is configured by the higher layer;

h(n) is a value based on the PUCCH format (F), in which, $n_{CQI}$ is the information bit number of CQI, and $n_{HARQ}$ is the bit number of HARQ; and g(i) is the current power control adjustment state of PUCCH, $$g(i) = g(i-1) + \sum_{m=0}^{M-1} \delta_{PUCCH}(i-k_m).$$

$\delta_{PUCCH}$ is a UE specific closed loop correction value, which is also called transmission power control (TPC) command.

It has to be noted that in the LTE system, in order to maintain the single-carrier character of uplink signal, for the same UE, the PUSCH and the PUCCH cannot be transmitted at the same time.

To make the base station know the margin between the configured maximum output power which is set by some UE at certain time and the estimated transmission power of PUSCH which is scheduled by the base station, so as to allow the base station to know whether the UE is limited in power, providing the basis for the base station to schedule resource scheduling and link adaptation of PUSCH for the next time, and schedule suitable modulation coding scheme and bandwidth for UE, and the UE needs to measure the power headroom (PH) of itself and reports it to the base station. In the LTE system, the power headroom of a certain UE on the subframe i is defined as:

$$PH(i) = P_{CMAX} - \{10\log_{10}(M_{PUSCH}(i)) + P_{O\_PUSCH}(j) + \alpha(j) \cdot PL + \Delta_{TF}(i) + f(i)\}[dB]$$

which is the difference between the configured maximum output power set by UE and the transmission power of PUSCH estimated by UE. The power headroom which is obtained by measuring and computing is quantized within the range of [40,−23] dB, to the extent of 1 dB as precision (the quantification relationship is shown in Table 1), and then is transferred to the higher layer by the physical layer. The media access control layer (called MAC layer for short) uses 6 bits index to represent the quantized power headroom. The mapping relationship is shown in Table 1, and the 6 bits index is also called power headroom.

In addition, the power headroom report (PHR) is event-triggered. When the UE has new PUSCH transmission on the current subframe, there is event triggering the PHR, and the channel resource which the base station assigns for the PUSCH transmission of the UE is, according to a certain priority of logical channels, enough to bear the power headroom MAC control element and MAC protocol data unit (PDU) sub-header thereof, the UE reports the 6 bits power headroom to the base station through the power headroom MAC control element.

The structure of the power headroom MAC control element is shown in FIG. 1. It is an octet, in which the highest 2 bits are reservation bits (R) set as 0, and the low 6 bits are the reported power headroom (PH).

It has to be noted that in the LTE system, only the power headroom of the subframes which transmit the PUSCH is measured.

TABLE 1 diagram of quantification and report mapping of power headroom

| PH | power headroom level | measured quantification value (dB) |
|---|---|---|
| 0 | POWER_HEADROOM_0 | $-23 \leq PH < -22$ |
| 1 | POWER_HEADROOM_1 | $-22 \leq PH < -21$ |
| 2 | POWER_HEADROOM_2 | $-21 \leq PH < -20$ |
| 3 | POWER_HEADROOM_3 | $-20 \leq PH < -19$ |
| 4 | POWER_HEADROOM_4 | $-19 \leq PH < -18$ |
| 5 | POWER_HEADROOM_5 | $-18 \leq PH < -17$ |
| ... | ... | ... |
| 57 | POWER_HEADROOM_57 | $34 \leq PH < 35$ |
| 58 | POWER_HEADROOM_58 | $35 \leq PH < 36$ |
| 59 | POWER_HEADROOM_59 | $36 \leq PH < 37$ |
| 60 | POWER_HEADROOM_60 | $37 \leq PH < 38$ |
| 61 | POWER_HEADROOM_61 | $38 \leq PH < 39$ |
| 62 | POWER_HEADROOM_62 | $39 \leq PH < 40$ |
| 63 | POWER_HEADROOM_63 | $PH \geq 40$ |

The LTE-Advanced system (called LTE-A system for short) is the next generation evolution system of the LTE system. As shown in FIG. 2, the LTE-A system adopts the carrier aggregation technology to expand the transmission bandwidth. Each aggregate carrier is called a "component carrier". Multiple component carries can be continuous or discontinuous, and can be in the same operating band or different operating bands.

In the LTE-A system, the user equipment can transmit PUSCH on one (uplink) component carrier, and also can simultaneously transmit multiple PUSCHs on multiple (uplink) component carriers; and one or multiple PUCCHs can be transmitted on one (uplink) component carrier. In addition, it is proposed in the research of PUCCH in the LTE-A system that the PUSCH and the PUCCH are simultaneously transmitted on one (uplink) component carrier.

Therefore, how to measure and report the power headroom in the LTE-A system which adopts the carrier aggregation becomes a problem to be promptly solved

SUMMARY OF THE INVENTION

The invention mainly aims to provide a method for processing power headroom and a terminal thereof, so as to at least solve the above problem.

According to one aspect of the present invention, a method for processing power headroom is provided, comprising: when transmitting the PUSCH and/or the PUCCH on subframe and component carrier group, a terminal measuring the power headroom on the subframe and the component carrier group; and the terminal reporting the power headroom to a base station and indicating the type of the reported power headroom while reporting.

According to another aspect of the present invention, a terminal is provided, comprising: a measuring module configured for measuring the power headroom on the subframe and the component carrier group, when transmitting the PUSCH and/or the PUCCH on the subframe and the component carrier group; and a transmitting module configured for reporting the power headroom to the base station and indicating the type of the reported power headroom while reporting.

Through the present invention, because the terminal also reports the type of the power headroom while reporting the power headroom, the problem that the reported power headroom cannot be distinguished in related technology is solved. Thus, the type to which the power headroom belongs is indicated specifically by reporting the type while reporting the power headroom, avoiding confusion.

BRIEF DESCRIPTION OF THE DRAWINGS

The drawings described here are used for providing further understanding of the present invention, and constitute part of the application. The exemplary embodiment and description of the present invention are used for explaining the invention, and do not compose undue limit on the invention. In the drawings.

DETAILED DESCRIPTION OF THE PRESENT INVENTION

The present invention is described below in detail with reference to the drawings and in combination with the embodiments. It has to be noted that the embodiments and the features thereof in the application can be combined with each other under condition of having no conflict.

Figure 1:
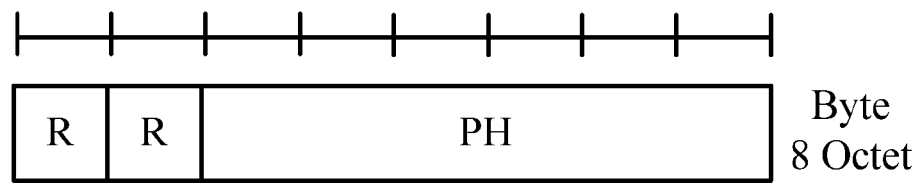
FIG. 1 shows a structural diagram of power headroom MAC control element in the LTE system according to the related technology.
Figure 2:
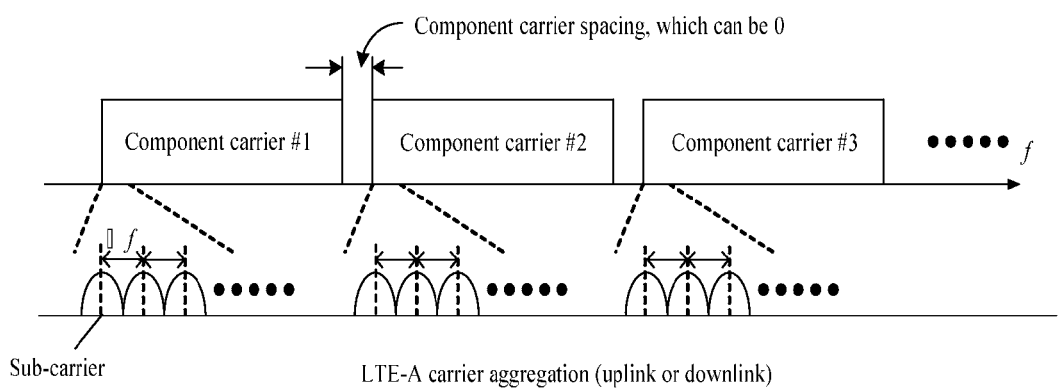
FIG. 2 shows a diagram of carrier aggregation of the LTE-A system according to the related technology.
Figure 3:
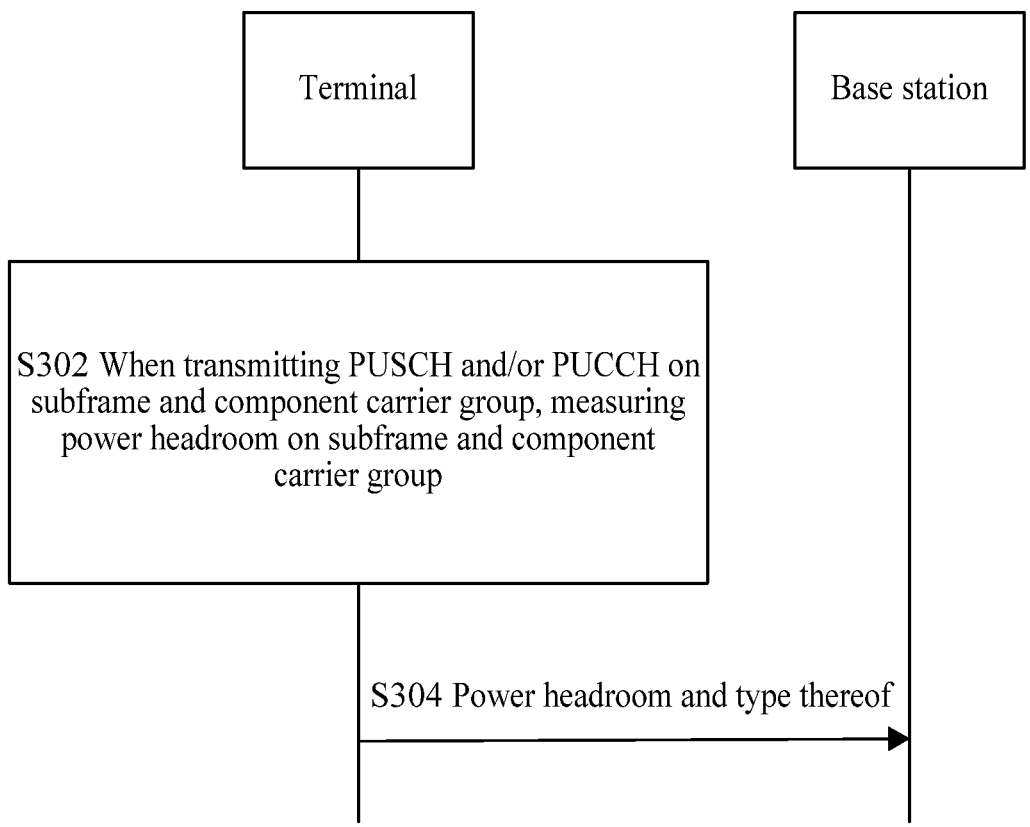
FIG. 3 shows a flowchart of a method for processing power headroom according to the embodiment of the present invention.

FIG. 3 shows a flowchart of a method for processing power headroom according to an embodiment of the present invention, comprising the following steps.

Step 302: when transmitting the PUSCH and/or the PUCCH on the subframe and the component carrier group, the terminal measures the power headroom on the subframe and the component carrier group.

Step 304: the terminal reports the power headroom to a base station and indicates the type of the reported power headroom while reporting.

In the embodiment, because the terminal measures the power headroom on the subframe and the component carrier group, when transmitting the PUSCH and/or the PUCCH on the subframe and the component carrier group, the problem of measuring the power headroom in the LTE-A system is solved, thereby realizing measurement and report of power headroom of the terminal.

In addition, because the terminal also indicates the type of the power headroom while reporting the power headroom, the problem that the reported power headroom cannot be distinguished in related technology is solved. Thus, the type to which the power headroom belongs is indicated specifically by reporting the type while reporting the power headroom, avoiding confusion.

The method for processing power headroom provided by the present invention comprises the two parts, the measuring part and the reporting part:

Part I. Measuring of Power Headroom

When transmitting the PUSCH and/or the PUCCH on the subframe i and the component carrier group j, the user equipment measures the power headroom PH(i,j) on the subframe i and the component carrier group j, in which, $0=<i<=9$; $0=<j<=N-1$ or $1=<j<=N$; and the value of N is equal to the number of component carrier groups which is prescribed in the LTE-A protocol.

Specifically, if each component carrier group includes only one component carrier, then the N is equal to the number of component carriers.

It comprises the following cases.

1) The user equipment only transmits the PUSCH on the subframe i and the component carrier group j.

When only transmitting the PUSCH on the subframe i and the component carrier group j, the user equipment measures the power headroom $PH_{PUSCH}(i,j)[dB]$ on the subframe i and the component carrier group j.

That the user equipment only transmits the PUSCH on the subframe i and the component carrier group j means that the user equipment transmits, on the subframe i, one PUSCH on one component carrier in the component carrier group j, or transmits multiple PUSCHs respectively on multiple component carriers (i.e., transmits one PUSCH on every component carrier in the multiple component carriers), and the user equipment does not transmit the PUCCH on any component carrier in the component carrier group j.

Assuming that the transmission power of PUSCH on the subframe i and the component carrier group j, which is estimated by the user equipment, is $P'_{PUSCH}(i,j)[dBm]$, and the configured maximum output power which is set by the user equipment on the subframe i and the component carrier group j is $P_{CMAX}(j)[dBm]$, the power headroom which is measured by the user equipment on the subframe i and the component carrier group j is:

$$PH_{PUSCH}(i,j)=P_{CMAX}(j)-P'_{PUSCH}(i,j)[dB] \quad (1)$$

which is the difference between the configured maximum output power which is set by the user equipment on the subframe i and the component carrier group j and the transmission power of PUSCH transmitted on the subframe i and the component carrier group j which is estimated by the user equipment.

Specifically, when the user equipment transmits multiple PUSCHs in the component carrier group j, $P'_{PUSCH}(i,j)$ is the sum of transmission powers of multiple PUSCHs which are estimated by the user equipment.

If the estimated transmission power of PUSCH on each component carrier in the component carrier group j is $P'_{PUSCH}(i,k)[dBm]$, in which k∈K is the sequential number of each component carrier in the component carrier group j, then $$P'_{PUSCH}(i,j) = 10\log_{10}\left(\sum_{k\in K} 10^{P'_{PUSCH}(i,k)/10}\right) [dBm] \quad (2)$$

The transmission power $P'_{PUSCH}(i,k)[dBm]$ of PUSCH, which is estimated by the user equipment is the one which is estimated by the user equipment according to the open loop and closed loop power control parameters and instructions of base station, the path loss estimate, and the number of resource blocks of PUSCH scheduled on the subframe i and the component carrier k and so on.

Specifically, $$P'_{PUSCH}(i,k)=10\log_{10}(M_{PUSCH}(i,k))+P_{O\_PUSCH}(h,k)+\alpha(h,k)\cdot PL+\Delta_{TF}(i,k)+f(i,k)[dBm]$$

in which, $M_{PUSCH}(i,k)$ is the bandwidth of PUSCH which is transmitted on the subframe i and the component carrier k, and is represented by the number of resource blocks (RB);

$P_{O\_PUSCH}(h,k)$ is an open loop power control parameter on the component carrier k;

$\alpha$ is the specific path loss compensation factor on the component carrier k;

PL is the uplink and downlink path loss estimate of component carrier k, which is measured and computed at the UE;

$\Delta_{TF}(i,k)$ is a power offset related to the modulation coding mode of the PUSCH transmitted on the subframe i and the component carrier k; and $f(i,k)$ is the current power control adjustment state of the PUSCH transmitted on the subframe i and the component carrier k.

2) The user equipment only transmits the PUCCH on the subframe i and the component carrier group j.

When only transmitting the PUCCH on the subframe i and the component carrier group j, the user equipment measures the power headroom $PH_{PUCCH}(i,j)$ on the subframe i and the component carrier group j.

That the user equipment only transmits the PUCCH on the subframe i and the component carrier group j means that the user equipment transmits, on the subframe i, one PUCCH on one component carrier in the component carrier group j, including the user equipment transmitting multiple PUCCHs on one component carrier in the component carrier group j, and the user equipment does not transmit the PUSCH on any component carrier in the component carrier group j.

Assuming that the transmission power of PUCCH on the subframe i and the component carrier group j, which is estimated by the user equipment, is $P'_{PUCCH}(i,j)[dBm]$, and the configured maximum output power which is set by the user equipment on the subframe i and the component carrier group j is $P_{CMAX}(j)[dBm]$, the power headroom which is measured by the user equipment on the subframe i and the component carrier group j is:

$$PH_{PUCCH}(i,j)=P_{CMAX}(j)-P'_{PUCCH}(i,j)[dB] \quad (3)$$

which is the difference between the configured maximum output power which is set by the user equipment on the subframe i and the component carrier group j and the transmission power of PUCCH transmitted on the subframe i and the component carrier group j which is estimated by the user equipment.

Specifically, when the user equipment transmits multiple PUCCHs in the component carrier group j, $P'_{PUCCH}(i,j)$ is the sum of transmission powers of multiple PUCCHs which are estimated by the user equipment.

If the estimated transmission power of PUCCH on each component carrier in the component carrier group j is $P'_{PUCCH}(i,k)$[dBm], in which k∈K is the sequential number of each component carrier in the component carrier group j, then $$P'_{PUCCH}(i, j) = 10\log_{10}\left(\sum_{k \in K} 10^{P'_{PUCCH}(i,k)/10}\right) \text{ [dBm]}. \quad (4)$$

If the estimated transmission power of PUCCH on the component carrier k is $P'_{PUCCH}(i,k)$[dBm], multiple PUCCHs are transmitted on the component carrier k, and the estimated transmission power of each PUCCH is $P'_{PUCCH}(i,k,c)$[dBm], in which c∈C is the sequential number of each PUCCH on the component carrier k, then $$P'_{PUCCH}(i, k) = 10\log_{10}\left(\sum_{c \in C} 10^{P'_{PUCCH}(i,k,c)/10}\right) \text{ [dBm]} \quad (5)$$

that is, when transmitting multiple PUCCHs on the subframe i and one component carrier in the component carrier group j, the user equipment estimates, as to the component carrier, the transmission power of each PUCCH transmitted on the component carrier, and the sum of transmission powers of PUCCHs transmitted on the component carrier is used as the transmission power of uplink physical channel transmitted on the component carrier, which is estimated by the user equipment.

The transmission power $P'_{PUCCH}(i,k,c)$ of PUCCH, which is estimated by the user equipment, is the one which is estimated by the user equipment according to the open loop and closed loop power control parameters, instructions of the base station, and the path loss estimate, and the PUCCH format with the sequential number of c transmitted on the subframe i and the component carrier k.

Specifically, $$P'_{PUCCH}(i,k,c) = P_{O\_PUCCH}(k) + PL + h(n_{CQI}, n_{HARQ}) + \Delta_{F\_PUCCH}(F) + g(i,k,c) \text{[dBm]},$$

$P_{O\_PUCCH}(k)$ is an open loop power control parameter on component carrier k;

$\Delta_{F\_PUCCH}(F)$ is a power offset related to the PUCCH format (F) of PUCCH with the sequential number of c transmitted on the subframe i and the component carrier k and is configured by the higher layer;

h(n) is a value based on the PUCCH format (F), in which $n_{CQI}$ is the information bit number of CQI, and $n_{HARQ}$ is the bit number of HARQ; and g(i,k,c) is the current power control adjustment state of PUCCH with the sequential number of c transmitted on the subframe i and the component carrier k.

3) The user equipment simultaneously transmits the PUSCH and the PUCCH on the subframe i and the component carrier group j.

Assuming that a user equipment simultaneously transmits the PUSCH and the PUCCH on the subframe i and the component carrier group j, the user equipment measures the power headroom on the subframe i and the component carrier group j.

That the user equipment simultaneously transmits the PUSCH and the PUCCH on the subframe i and the component carrier group j means that the user equipment transmits, on the subframe i, the PUSCH on one or multiple component carries in the component carrier group j, and transmits the PUCCH on one component carrier in the component carrier group j.

Assuming that transmission power of PUSCH on the subframe i and the component carrier group j, which is estimated by the user equipment, is $P'_{PUCCH}(i,j)$[dBm], the estimated transmission power of PUCCH is $P'_{PUCCH}(i,j)$[dBm], and the configured maximum output power which is set by the user equipment on the subframe i and the component carrier group j is $P_{CMAX}(j)$[dBm], the power headroom which is measured by the user equipment on the subframe i and the component carrier group j is:

a:

$$PH_{PUCCH+PUSCH}(i, j) = 10\log_{10}\left(10^{P_{CMAX}(j)/10} - 10^{P'_{PUCCH}(i,j)/10}\right) - \quad (6)$$
$$P'_{PUSCH}(i, j)$$
$$= 10\log_{10}\left(\frac{10^{P_{CMAX}(j)/10} - 10^{P'_{PUCCH}(i,j)/10}}{10^{P'_{PUSCH}(i,j)/10}}\right) \text{ [dB]}.$$

Or b:

$$PH'_{PUCCH+PUSCH}(i, j) = P_{CMAX}(j) - \quad (7)$$
$$10\log_{10}\left(10^{P'_{PUSCH}(i,j)/10} + 10^{P'_{PUCCH}(i,j)/10}\right)$$
$$= 10\log_{10}\left(\frac{10^{P_{CMAX}(j)/10}}{10^{P'_{PUSCH}(i,j)/10} + 10^{P'_{PUCCH}(i,j)/10}}\right) \text{ [dB]}.$$

Or c:

$PH_{PUSCH}(i, j)$ and $PH_{PUCCH}(i, j)$, in which
$PH_{PUSCH}(i, j) = P'_{CMAX}(j) - P'_{PUSCH}(i, j)$ [dB];
$PH_{PUCCH}(i, j) = P''_{CMAX}(j) - P'_{PUCCH}(i, j)$ [dB].

Specifically, $P_{CMAX}(j) = P'_{CMAX}(j) = P''_{CMAX}(j)$ is the configured maximum output power which is set by the user equipment on the subframe i and the component carrier group j;

or $P'_{CMAX}(j)$ is the configured maximum output power on the component carrier group j, which is set by the user equipment, assuming that the user equipment only transmits the PUSCH on the component carrier group j;

in which, the transmission configuration (including modulation order, transmission width position, transmission width configuration (number of occupied physical resource blocks) and so on) of PUSCH assumed to be transmitted is same as the configuration of PUSCH transmitted on the subframe i and the component carrier group j.

Specifically, $P''_{CMAX}(j)$ is the configured maximum output power on the component carrier group j, which is set by the user equipment, assuming that the user equipment only transmits the PUCCH on the component carrier group j;

in which, the transmission configuration (including modulation order, transmission width position, transmission width configuration and so on) of PUCCH assumed to be transmitted is same as the configuration of PUCCH transmitted on the subframe i and the component carrier group j.

Or d:

$PH_{PUCCH+PUSCH}(i,j)$ and $PH_{PUCCH}(i,j)$ which is defined as same as a and c.

Or e:

$PH'_{PUCCH+PUSCH}(i,j)$ and $PH_{PUCCH}(i,j)$, which is defined as same as b and c.

Or f:

$PH_{PUCCH+PUSCH}(i,j)$ and $PH_{PUSCH}(i,j)$, which is defined as same as a and c.

Or g:

$PH'_{PUCCH+PUSCH}(i,j)$ and $PH_{PUSCH}(i,j)$, which is defined as same as b and c.

Or h:

$PH_{PUCCH+PUSCH}(i,j)$ and $PH_{PUSCH}(i,j)$ and $PH_{PUCCH}(i,j)$, which is defined as same as a and c.

Or i:

$PH'_{PUCCH+PUSCH}(i,j)$ and $PH_{PUSCH}(i,j)$ and $PH_{PUCCH}(i,j)$, which is defined as same as b and c.

Or, the type and number of the power headrooms which are measured by the user equipment on the subframe i and the component carrier group j are configured by higher layer signalling.

Specifically, when the user equipment transmits multiple PUSCHs in the component carrier group j, $P'_{PUSCH}(i,j)$ is the sum of multiple transmission powers of the multiple PUSCHs which are estimated by the user equipment.

If the transmission power of PUSCH estimated on each component carrier in the component carrier group j is $P'_{PUSCH}(i,k)[dBm]$, in which k∈K is the sequential number of each component carrier in the component carrier group j, then $$P'_{PUSCH}(i,j) = 10\log_{10}\left(\sum_{k \in K} 10^{P'_{PUSCH}(i,k)/10}\right) \; [dBm].$$

Specifically, when the user equipment transmits multiple PUCCHs in the component carrier group j, $P'_{PUCCH}(i,j)$ is the sum of multiple transmission powers of the multiple PUCCHs which are estimated by the user equipment.

If the transmission power of PUCCH estimated on each component carrier in the component carrier group j is $P'_{PUCCH}(i,k)[dBm]$, in which k∈K is the sequential number of each component carrier in the component carrier group j, then $$P'_{PUCCH}(i,j) = 10\log_{10}\left(\sum_{k \in K} 10^{P'_{PUCCH}(i,k)/10}\right) \; [dBm].$$

If the transmission power of PUCCH estimated on the component carrier k is $P'_{PUCCH}(i,k)[dBm]$, multiple PUCCHs are transmitted on the component carrier k, and the estimated transmission power of individual PUCCHs is $P'_{PUCCH}(i,k,c)[dBm]$, in which c∈C is the sequential number of each PUCCH on the component carrier k, then $$P'_{PUCCH}(i,k) = 10\log_{10}\left(\sum_{c \in C} 10^{P'_{PUCCH}(i,k,c)/10}\right) \; [dBm]. \qquad (8)$$

In the three cases above, the component carrier group j is a group of component carriers composed of one or multiple component carriers. These component carriers can be used for sending the uplink signal. Each component carrier group can include only one component carrier.

Specifically, the component carrier group can include all the component carriers which use the same power amplifier (PA) at the user equipment. The component carrier group also can include all the component carriers supported by the user equipment.

Part II. Reporting of Power Headroom

1) If the user equipment only transmits the PUCCH on the subframe i and the component carrier group j, the user equipment has new uplink transmission on the subframe i, and there is an event triggering the reporting of the power headroom on the subframe i and the component carrier group j, then according to a certain priority of logical channels, if the uplink resource allocated to the user equipment on the subframe i is enough to bear one power headroom MAC control element which is used for reporting the power headroom on the subframe i and the component carrier group j and MAC protocol data unit (PDU) sub-header thereof, then the user equipment reports the power headroom on the subframe i and the component carrier group j, on the subframe i;

otherwise, the user equipment does not report the power headroom on the subframe i and the component carrier group j, on the subframe i.

Furthermore, if the user equipment only transmits the PUSCH on the subframe i and the component carrier group j, and the user equipment has new uplink transmission on the subframe i and the component carrier group j, and there is an event triggering the reporting of the power headroom on the subframe i and the component carrier group j, then according to a certain priority of logical channels, if the uplink resource allocated to the user equipment on the subframe i and the component carrier group j is enough to bear one power headroom MAC control element which is used for reporting the power headroom on the subframe i and the component carrier group j and MAC protocol data unit (PDU) sub-header thereof, then the user equipment reports on the subframe i and the component carrier group j the power headroom on the subframe i and the component carrier group j;

otherwise, the user equipment does not report the power headroom on the subframe i and the component carrier group j, on the subframe i.

The power headroom on the subframe i and the component carrier group j, which is reported by the user equipment, is $PH_{PUSCH}(i,j)$.

2) If the user equipment only transmits the PUCCH on the subframe i and the component carrier group j, and the user equipment has new uplink transmission on the subframe i+n, and there is an event triggering the reporting of the power headroom on the subframe i and the component carrier group j, then if the uplink resource allocated to the user equipment on the subframe i+n is enough to bear one power headroom MAC control element which is used for reporting the power headroom on the subframe i and the component carrier group j and MAC PDU sub-header thereof, according to a certain priority of logical channels, then the user equipment reports the power headroom on the subframe i and the component carrier group j, on the subframe i;

otherwise, the user equipment does not report the power headroom on the subframe i and the component carrier group j, on the subframe i.

Specifically, the subframe i+n is the first subframe in which the user equipment has new uplink transmission, after the subframe i.

Furthermore, if the user equipment only transmits the PUCCH on the subframe i and the component carrier group j, and the user equipment has new uplink transmission on the subframe i+n and the component carrier group j, and there is an event triggering the reporting of the power headroom on the subframe i and the component carrier group j, then according to a certain priority of logical channels, if the uplink resource allocated to the user equipment on the subframe i+n and the component carrier group j is enough to bear one power headroom MAC control element which is used for reporting the power headroom on the subframe i and the component carrier group j and MAC PDU sub-header thereof, then the user equipment reports the power headroom on the subframe i and the component carrier group j, on the subframe i;

otherwise, the user equipment does not report the power headroom on the subframe i and the component carrier group j, on the subframe i.

Specifically, the subframe i+n is the first subframe in which the user equipment has new uplink transmission on the component carrier group j, after the subframe i. The power headroom on the subframe i and the component carrier group j, which is reported by the user equipment, is $PH_{PUCCH}(i,j)$.

3) The user equipment simultaneously transmits the PUSCH and the PUCCH on the subframe i and the component carrier group j.

for Item a or b:

if the user equipment simultaneously transmits the PUSCH and the PUCCH on the subframe i and the component carrier group j, and the user equipment has new uplink transmission on the subframe i, and there is an event triggering the reporting of the power headroom on the subframe i and the component carrier group j, then if the uplink resource allocated to the user equipment on the subframe i is enough to bear one power headroom MAC control element which is used for reporting the power headroom on the subframe i and the component carrier group j and MAC PDU sub-header thereof, according to a certain priority of logical channels, then the user equipment reports the power headroom on the subframe i and the component carrier group j, on the subframe i;

otherwise, the user equipment does not report the power headroom on the subframe i and the component carrier group j, on the subframe i.

Furthermore, if the user equipment simultaneously transmits the PUSCH and the PUCCH on the subframe i and the component carrier group j, and the user equipment has new uplink transmission on the subframe i and the component carrier group j, and there is an event triggering the reporting of the power headroom on the subframe i and the component carrier group j, then if the uplink resource allocated to the user equipment on the subframe i and the component carrier group j is enough to bear one power headroom MAC control element which is used for reporting the power headroom on the subframe i and the component carrier group j and MAC PDU sub-header thereof, according to a certain priority of logical channels, then the user equipment reports the power headroom on the subframe i and the component carrier group j, on the subframe i and the component carrier group j;

otherwise, the user equipment does not report the power headroom on the subframe i and the component carrier group j, on the subframe i.

The power headroom on the subframe i and the component carrier group j, which is reported by the user equipment, is:

for a: $PH_{PUCCH+PUSCH}(i,j)$;

for b: $PH'_{PUCCH+PUSCH}(i,j)$.

For Item c-i:

if the user equipment simultaneously transmits the PUSCH and the PUCCH on the subframe i and the component carrier group j, and the user equipment has new uplink transmission on the subframe i, and there is an event triggering the reporting of the power headroom on the subframe i and the component carrier group j, then I: according to a certain priority of logical channels, if the uplink resource allocated to the user equipment on the subframe i is enough to bear two power headroom MAC control elements which are used for reporting the power headroom on the subframe i and the component carrier group j and MAC PDU sub-header thereof, then the user equipment reports the power headroom on the subframe i and the component carrier group j, on the subframe i;

II: or else, according to a certain priority of logical channels, if the uplink resource allocated to the user equipment on the subframe i is enough to bear one power headroom MAC control element which is used for reporting the power headroom on the subframe i and the component carrier group j and MAC PDU sub-header thereof, then the user equipment reports the power headroom on the subframe i and the component carrier group j, on the subframe i;

III: otherwise, the user equipment does not report the power headroom on the subframe i and the component carrier group j, on the subframe i.

Furthermore, if the user equipment simultaneously transmits the PUSCH and the PUCCH on the subframe i and the component carrier group j, and the user equipment has new uplink transmission on the subframe i and the component carrier group j, and there is an event triggering the reporting of the power headroom on the subframe i and the component carrier group j, then I: according to a certain priority of logical channels, if the uplink resource allocated to the user equipment on the subframe i and the component carrier group j is enough to bear two power headroom MAC control elements which are used for reporting the power headroom on the subframe i and the component carrier group j and MAC PDU sub-header thereof, then the user equipment reports the power headroom on the subframe i and the component carrier group j, on the subframe i and the component carrier group j;

II: or else, according to a certain priority of logical channels, if the uplink resource allocated to the user equipment on the subframe i and the component carrier group j is enough to bear one power headroom MAC control element which is used for reporting the power headroom on the subframe i and the component carrier group j and MAC PDU sub-header thereof, then the user equipment reports the power headroom on the subframe i and the component carrier group j, on the subframe i and the component carrier group j; and III: otherwise, the user equipment does not report the power headroom on the subframe i and the component carrier group j, on the subframe i.

In the situation of I, the power headroom on the subframe i and the component carrier group j, which is reported by the user equipment on the subframe i, is:

for c: $PH_{PUSCH}(i,j)$ and $PH_{PUCCH}(i,j)$;

for d: $PH_{PUCCH+PUSCH}(i,j)$ and $PH_{PUCCH}(i,j)$;

for e: $PH'_{PUCCH+PUSCH}(i,j)$ and $PH_{PUCCH}(i,j)$;

for f: $PH_{PUCCH+PUSCH}(i,j)$ and $PH_{PUSCH}(i,j)$;

for g: $PH'_{PUCCH+PUSCH}(i,j)$ and $PH_{PUSCH}(i,j)$;

for h: $PH_{PUSCH}(i,j)$ and $PH_{PUCCH}(i,j)$, or $PH_{PUCCH+PUSCH}(i,j)$ and $PH_{PUSCH}(i,j)$ or $PH_{PUCCH+PUSCH}(i,j)$ and $PH_{PUCCH}(i,j)$;

in which, in the case of h, when $PH_{PUCCH+PUSCH}(i,j) \geq 0$ or $PH_{PUCCH+PUSCH}(i,j) > 0$, the power headroom on the subframe i and the component carrier group j, which is reported by the user equipment on the subframe i, is $PH_{PUSCH}(i,j)$ and $PH_{PUCCH}(i,j)$; and when $PH_{PUCCH+PUSCH}(i,j) < 0$ or $PH_{PUCCH+PUSCH}(i,j) \leq 0$, the power headroom on the subframe i and the component carrier group j, which is reported by the user equipment on the subframe i, is $PH_{PUCCH+PUSCH}(i,j)$ and $PH_{PUSCH}(i,j)$, or $PH_{PUCCH+PUSCH}(i,j)$ and $PH_{PUCCH}(i,j)$;

or, when $PH_{PUCCH+PUSCH}(i,j) \geq 0$ or $PH_{PUCCH+PUSCH}(i,j) > 0$, the power headroom on the subframe i and the component carrier group j, which is reported by the user equipment on the subframe i, is $PH_{PUCCH+PUSCH}(i,j)$ and $PH_{PUSCH}(i,j)$ or $PH_{PUCCH+PUSCH}(i,j)$ and $PH_{PUCCH}(i,j)$;

when $PH_{PUCCH+PUSCH}(i,j) < 0$ or $PH_{PUCCH+PUSCH}(i,j) \leq 0$, the power headroom on the subframe i and the component carrier group j, which is reported by the user equipment on the subframe i, is $PH_{PUSCH}(i,j)$ and $PH_{PUCCH}(i,j)$.

For i: $PH_{PUSCH}(i,j)$ and $PH_{PUCCH}(i,j)$, or $PH'_{PUCCH+PUSCH}(i,j)$ and $PH_{PUSCH}(i,j)$ or $PH'_{PUCCH+PUSCH}(i,j)$ and $PH_{PUCCH}(i,j)$;

in the case of i, when $PH'_{PUCCH+PUSCH}(i,j) \geq 0$ or $PH'_{PUCCH+PUSCH}(i,j) > 0$, the power headroom on the subframe i and the component carrier group j, which is reported by the user equipment on the subframe i, is $PH'_{PUCCH+PUSCH}(i,j)$ and $PH_{PUSCH}(i,j)$, or $PH'_{PUCCH+PUSCH}(i,j)$ and $PH_{PUCCH}(i,j)$; and when $PH'_{PUCCH+PUSCH}(i,j) < 0$ or $PH'_{PUCCH+PUSCH}(i,j) \leq 0$, the power headroom on the subframe i and the component carrier group j, which is reported by the user equipment on the subframe i, is $PH_{PUSCH}(i,j)$ and $PH_{PUCCH}(i,j)$;

or, when $PH'_{PUCCH+PUSCH}(i,j) \geq 0$ or $PH'_{PUCCH+PUSCH}(i,j) > 0$, the power headroom on the subframe i and the component carrier group j, which is reported by the user equipment on the subframe i, is $PH_{PUSCH}(i,j)$ and $PH_{PUCCH}(i,j)$; and when $PH'_{PUCCH+PUSCH}(i,j) < 0$ or $PH'_{PUCCH+PUSCH}(i,j) \leq 0$, the power headroom on the subframe i and the component carrier group j, which is reported by the user equipment on the subframe i, is $PH'_{PUCCH+PUSCH}(i,j)$ and $PH_{PUSCH}(i,j)$, or $PH'_{PUCCH+PUSCH}(i,j)$ and $PH_{PUCCH}(i,j)$.

In the situation of II, the power headroom on the subframe i and the component carrier group j, which is reported by the user equipment on the subframe i, is:

for c: $PH_{PUSCH}(i,j)$ or $PH_{PUCCH}(i,j)$;

for d: $PH_{PUCCH+PUSCH}(i,j)$ or $PH_{PUCCH}(i,j)$;

in which, in the case of d, when $PH_{PUCCH+PUSCH}(i,j) \geq 0$ or $PH_{PUCCH+PUSCH}(i,j) > 0$, the power headroom on the subframe i and the component carrier group j, which is reported by the user equipment on the subframe i, is $PH_{PUCCH+PUSCH}(i,j)$; and when $PH_{PUCCH+PUSCH}(i,j) < 0$ or $PH_{PUCCH+PUSCH}(i,j) \leq 0$, the power headroom on the subframe i and the component carrier group j, which is reported by the user equipment on the subframe i, is $PH_{PUCCH}(i,j)$; or when the $PH_{PUCCH+PUSCH}(i,j) \geq 0$ or $PH_{PUCCH+PUSCH}(i,j) > 0$, the power headroom on the subframe i and the component carrier group j, which is reported by the user equipment on the subframe i, is $PH_{PUCCH}(i,j)$; and when $PH_{PUCCH+PUSCH}(i,j) < 0$ or $PH_{PUCCH+PUSCH}(i,j) \leq 0$, the power headroom on the subframe i and the component carrier group j, which is reported by the user equipment on the subframe i, is $PH_{PUCCH+PUSCH}(i,j)$.

For e: $PH'_{PUCCH+PUSCH}(i,j)$ or $PH_{PUCCH}(i,j)$;

in the case of e, when $PH'_{PUCCH+PUSCH}(i,j) \geq 0$ or $PH'_{PUCCH+PUSCH}(i,j) > 0$, the power headroom on the subframe i and the component carrier group j, which is reported by the user equipment on the subframe i, is $PH'_{PUCCH+PUSCH}(i,j)$; and when $PH'_{PUCCH+PUSCH}(i,j) < 0$ or $PH'_{PUCCH+PUSCH}(i,j) \leq 0$, the power headroom on the subframe i and the component carrier group j, which is reported by the user equipment on the subframe i, is $PH_{PUCCH}(i,j)$; or when $PH'_{PUCCH+PUSCH}(i,j) \geq 0$ or $PH'_{PUCCH+PUSCH}(i,j) > 0$, the power headroom on the subframe i and the component carrier group j, which is reported by the user equipment on the subframe i, is $PH_{PUCCH}(i,j)$; when $PH'_{PUCCH+PUSCH}(i,j) < 0$ or $PH'_{PUCCH+PUSCH}(i,j) \leq 0$, the power headroom on the subframe i and the component carrier group j, which is reported by the user equipment on the subframe i, is $PH'_{PUCCH+PUSCH}(i,j)$.

For f: $PH_{PUCCH+PUSCH}(i,j)$ or $PH_{PUSCH}(i,j)$;

in the case of f, when $PH_{PUCCH+PUSCH}(i,j) \geq 0$ or $PH_{PUCCH+PUSCH}(i,j) > 0$, the power headroom on the subframe i and the component carrier group j, which is reported by the user equipment on the subframe i, is $PH_{PUSCH}(i,j)$; and when $PH_{PUCCH+PUSCH}(i,j) < 0$ or $PH_{PUCCH+PUSCH}(i,j) \leq 0$, the power headroom on the subframe i and the component carrier group j, which is reported by the user equipment on the subframe i, is $PH_{PUCCH+PUSCH}(i,j)$; or when $PH_{PUCCH+PUSCH}(i,j) \geq 0$ or $PH_{PUCCH+PUSCH}(i,j) > 0$, the power headroom on the subframe i and the component carrier group j, which is reported by the user equipment on the subframe i, is $PH_{PUCCH+PUSCH}(i,j)$; when $PH_{PUCCH+PUSCH}(i,j) < 0$ or $PH_{PUCCH+PUSCH}(i,j) \leq 0$, the power headroom on the subframe i and the component carrier group j, which is reported by the user equipment on the subframe i, is $PH_{PUSCH}(i,j)$.

For g: $PH'_{PUCCH+PUSCH}(i,j)$ or $PH_{PUSCH}(i,j)$;

in the case of g, when $PH'_{PUCCH+PUSCH}(i,j) \geq 0$ or $PH'_{PUCCH+PUSCH}(i,j) > 0$, the power headroom on the subframe i and the component carrier group j, which is reported by the user equipment on the subframe i, is $PH_{PUSCH}(i,j)$; when $PH'_{PUCCH+PUSCH}(i,j) < 0$ or $PH'_{PUCCH+PUSCH}(i,j) \leq 0$, the power headroom on the subframe i and the component carrier group j, which is reported by the user equipment on the subframe i, is $PH'_{PUCCH+PUSCH}(i,j)$; or when $PH'_{PUCCH+PUSCH}(i,j) \geq 0$ or $PH'_{PUCCH+PUSCH}(i,j) > 0$, the power headroom on the subframe i and the component carrier group j, which is reported by the user equipment on the subframe i, is $PH'_{PUCCH+PUSCH}(i,j)$; when $PH'_{PUCCH+PUSCH}(i,j) < 0$ or $PH'_{PUCCH+PUSCH}(i,j) \leq 0$, the power headroom on the subframe i and the component carrier group j, which is reported by the user equipment on the subframe i, is $PH_{PUSCH}(i,j)$.

For h: $PH_{PUSCH}(i,j)$ or $PH_{PUCCH}(i,j)$ or $PH_{PUCCH+PUSCH}(i,j)$;

in the case of h, when $PH_{PUCCH+PUSCH}(i,j) \geq 0$ or $PH_{PUCCH+PUSCH}(i,j) > 0$, the power headroom on the subframe i and the component carrier group j, which is reported by the user equipment on the subframe i, is $PH_{PUSCH}(i,j)$ or $PH_{PUCCH}(i,j)$; when $PH_{PUCCH+PUSCH}(i,j) < 0$ or $PH_{PUCCH+PUSCH}(i,j) \leq 0$, the power headroom on the subframe i and the component carrier group j, which is reported by the user equipment on the subframe i, is $PH_{PUCCH+PUSCH}(i,j)$;

or, when $PH_{PUCCH+PUSCH}(i,j) \geq 0$ or $PH_{PUCCH+PUSCH}(i,j) > 0$, the power headroom on the subframe i and the component carrier group j, which is reported by the user equipment on the subframe i, is $PH_{PUCCH+PUSCH}(i,j)$; when $PH_{PUCCH+PUSCH}(i,j) < 0$ or $PH_{PUCCH+PUSCH}(i,j) \leq 0$, the power headroom on the subframe i and the component carrier group j, which is reported by the user equipment on the subframe i, is $PH_{PUSCH}(i,j)$ or $PH_{PUCCH}(i,j)$.

For i: $PH_{PUSCH}(i,j)$ or $PH_{PUCCH}(i,j)$ or $PH'_{PUCCH+PUSCH}(i,j)$;

in the case of i, when $PH'_{PUCCH+PUSCH}(i,j) \geq 0$ or $PH'_{PUCCH+PUSCH}(i,j) > 0$, the power headroom on the subframe i and the component carrier group j, which is reported by the user equipment on the subframe i, is $PH'_{PUCCH+PUSCH}(i,j)$; when $PH'_{PUCCH+PUSCH}(i,j) < 0$ or $PH'_{PUCCH+PUSCH}(i,j) \leq 0$, the power headroom on the subframe i and the component carrier group j, which is reported by the user equipment on the subframe i, is $PH_{PUSCH}(i,j)$ or $PH_{PUCCH}(i,j)$; or when $PH'_{PUCCH+PUSCH}(i,j) \geq 0$ or $PH'_{PUCCH+PUSCH}(i,j) > 0$, the power headroom on the subframe i and the component carrier group j, which is reported by the user equipment on the subframe i, is $PH_{PUSCH}(i,j)$ or $PH_{PUCCH}(i,j)$; when $PH'_{PUCCH+PUSCH}(i,j) < 0$ or $PH'_{PUCCH+PUSCH}(i,j) \leq 0$, the power headroom on the subframe i and the component carrier group j, which is reported by the user equipment on the subframe i, is $PH'_{PUCCH+PUSCH}(i,j)$.

Or, in the situation of I and II, the type of power headroom on the subframe i and the component carrier group j, which is reported by the user equipment, is configured by the higher layer signalling, wherein the type of the reported power headroom indicates the result of a certain power headroom calculated by adopting one of the above algorithms.

The user equipment indicates the type of the reported power headroom while reporting the power headroom to the base station, wherein the user equipment reports the power headroom through the power headroom MAC control element.

Furthermore, the user equipment indicates the type of the reported power headroom in the power headroom MAC control element while reporting the power headroom to the base station.

Furthermore, the highest bit and/or the secondarily highest bit in the power headroom MAC control element are/is used for indicating the type of the reported power headroom.

The type above represents that the corresponding power headroom is $PH_{PUSCH}(i,j)$ or $PH_{PUCCH}(i,j)$ or $PH_{PUCCH+PUSCH}(i,j)$ or $PH'_{PUCCH+PUSCH}(i,j)$.

For example, the highest bit or the secondarily highest bit in the power headroom MAC control element is set as 0 to indicate the reported power headroom is $PH_{PUSCH}(i,j)$.

The highest bit or the secondarily highest bit in the power headroom MAC control element is set as 1 to indicate the reported power headroom is $PH_{PUCCH}(i,j)$.

Or, the highest bit or the secondarily highest bit in the power headroom MAC control element is set as 0 to indicate the reported power headroom is $PH_{PUSCH}(i,j)$.

The highest bit or the secondarily highest bit in the power headroom MAC control element is set as 1 to indicate the reported power headroom is $PH_{PUCCH+PUSCH}(i,j)$ (or $PH'_{PUCCH+PUSCH}(i,j)$).

Or, the highest two bits in the power headroom MAC control element are set as 00 to indicate the reported power headroom is $PH_{PUSCH}(i,j)$.

The highest two bits in the power headroom MAC control element are set as 01 or 10 or 11 to indicate the reported power headroom is $PH_{PUCCH}(i,j)$.

Or, the highest two bits in the power headroom MAC control element are set as 00 to indicate the reported power headroom is $PH_{PUSCH}(i,j)$.

The highest two bits in the power headroom MAC control element are set as 01 or 10 or 11 to indicate the reported power headroom is $PH_{PUCCH+PUSCH}(i,j)$ (or $PH'_{PUCCH+PUSCH}(i,j)$).

Or, the highest two bits in the power headroom MAC control element are set as 00 to indicate the reported power headroom is $PH_{PUSCH}(i,j)$.

The highest two bits in the power headroom MAC control element are set as 01 or 10 or 11 to indicate the reported power headroom is $PH_{PUCCH}(i,j)$.

The highest two bits in the power headroom MAC control element are set as 10 or 11 or 01 to indicate the reported power headroom is $PH_{PUCCH+PUSCH}(i,j)$ (or $PH'_{PUCCH+PUSCH}(i,j)$).

Hereinafter, the present invention is explained under the specific situation that the component carrier group includes only one component carrier.

Part I. Measuring Power Headroom on Component Carrier

When each component carrier group includes only one component carrier, the user equipment measures the power headroom on each component carrier.

A) Assuming that an user equipment only transmits the PUSCH on the subframe i and the component carrier k without transmitting the PUCCH, the user equipment measures the power headroom $PH_{PUSCH}(i,k)$ on the subframe i and the component carrier k.

Assuming that the transmission power of PUSCH on the subframe i and the component carrier k, which is estimated by the user equipment, is $P'_{PUSCH}(i,k)[dBm]$, and the configured maximum output power which is set by the user equipment on the subframe i and the component carrier k is $P_{CMAX}(k)[dBm]$, the power headroom which is measured by the user equipment on the subframe i and the component carrier k is:

$$PH_{PUSCH}(i,k) = P_{CMAX}(k) - P'_{PUSCH}(i,k)[dB];$$

which is the difference between the configured maximum output power which is set by the user equipment on the subframe i and the component carrier k and the transmission power of PUSCH transmitted on the subframe i and the component carrier k which is estimated by the user equipment.

B) Assuming that an user equipment only transmits the PUCCH on the subframe i and the component carrier k without transmitting the PUSCH, the user equipment measures the power headroom $PH_{PUCCH}(i,k)$ on the subframe i and the component carrier k.

Assuming that the transmission power of PUCCH on the subframe i and the component carrier k, which is estimated by the user equipment, is $P'_{PUCCH}(i,k)[dBm]$, and the configured maximum output power which is set by the user equipment on the subframe i and the component carrier k is $P_{CMAX}(k)[dBm]$, the power headroom which is measured by the user equipment on the subframe i and the component carrier k is:

$$PH_{PUCCH}(i,k) = P_{CMAX}(k) - P'_{PUCCH}(i,k)[dB];$$

which is the difference between the configured maximum output power which is set by the user equipment on the subframe i and the component carrier k and the transmission power of PUCCH transmitted on the subframe i and the component carrier k which is estimated by the user equipment.

If multiple PUCCHs are transmitted on the component carrier k, and the transmission power of each PUCCH channel, which is estimated by the user equipment, is $P'_{PUCCH}(i,k,c)[dBm]$, in which, $c \in C$ is the sequential number of each PUCCH on the component carrier k, then $$P'_{PUCCH}(i,k) = 10\log_{10}\left(\sum_{c \in C} 10^{P'_{PUCCH}(i,k,c)/10}\right) [dBm].$$

C) Assuming an user equipment simultaneously transmits the PUSCH and the PUCCH on the subframe i and the component carrier k, the user equipment measures the power headroom on the subframe i and the component carrier k.

Assuming that the transmission power of PUSCH on the subframe i and the component carrier k, which is estimated by the user equipment, is $P'_{PUSCH}(i,k)[dBm]$, and the estimated transmission power of PUCCH is $P'_{PUCCH}(i,k)[dBm]$, and the configured maximum output power which is set by the user equipment on the component carrier k is $P_{CMAX}(k)[dBm]$, the power headroom which is measured by the user equipment on the subframe i and the component carrier k is:

a:

$$PH_{PUCCH+PUSCH}(i, k) = 10\log_{10}\left(10^{P_{CMAX}(k)/10} - 10^{P'_{PUCCH}(i,k)/10}\right) - P'_{PUSCH}(i, k)$$

$$= 10\log_{10}\left(\frac{10^{P_{CMAX}(k)/10} - 10^{P'_{PUCCH}(i,k)/10}}{10^{P'_{PUSCH}(i,k)/10}}\right) \text{ [dB]};$$

or b:

$$PH'_{PUCCH+PUSCH}(i, k) = P_{CMAX}(k) - 10\log_{10}\left(10^{P'_{PUSCH}(i,k)/10} + 10^{P'_{PUCCH}(i,k)/10}\right)$$

$$= 10\log_{10}\left(\frac{10^{P_{CMAX}(k)/10}}{10^{P'_{PUSCH}(i,k)/10} + 10^{P'_{PUCCH}(i,k)/10}}\right) \text{ [dB]};$$

Or c:

$PH_{PUCCH}(i, k)$ and $PH_{PUSCH}(i, k)$, in which
$PH_{PUCCH}(i, k) = P'_{CMAX}(k) - P'_{PUCCH}(i, k)$ [dB]
$PH_{PUSCH}(i, k) = P''_{CMAX}(k) - P'_{PUSCH}(i, k)$ [dB];

specifically, $P_{CMAX}(j) = P'_{CMAX}(j) = P''_{CMAX}(j)$ is the configured maximum output power which is set by the user equipment on the subframe i and the component carrier k;

specifically, $P'_{CMAX}(k)$ is the configured maximum output power on the component carrier k which is set by the user equipment, assuming that the user equipment only transmits the PUSCH on the component carrier k;

specifically, the transmission configuration of (including modulation order, transmission width position, transmission width configuration and so on) of PUSCH assumed to be transmitted is the same as the configuration of PUSCH transmitted on the subframe i and the component carrier k;

specifically, $P''_{CMAX}(k)$ is the configured maximum output power on the component carrier k which is set by the user equipment, assuming that the user equipment only transmits the PUCCH on the component carrier k;

specifically, the transmission configuration (including modulation order, transmission width position, transmission width configuration and so on) of PUCCH assumed to be transmitted is the same as the configuration of PUCCH transmitted on the subframe i and the component carrier k;

or d:
$PH_{PUCCH+PUSCH}(i,k)$ and $PH_{PUCCH}(i,k)$, which are respectively defined as the same as Items a and c;

or e:
$PH'_{PUCCH+PUSCH}(i,k)$ and $PH_{PUCCH}(i,k)$, which are respectively defined as the same as Items b and c;

or f:
$PH_{PUCCH+PUSCH}(i,k)$ and $PH_{PUSCH}(i,k)$, which are respectively defined as the same as Items a and c;

or g:
$PH'_{PUCCH+PUSCH}(i,k)$ and $PH_{PUSCH}(i,k)$, which are respectively defined as the same as Items b and c;

or h:
$PH_{PUCCH+PUSCH}(i,k)$ and $PH_{PUSCH}(i,k)$ and $PH_{PUCCH}(i, k)$, which are respectively defined as the same as Items a and c;

or i:
$PH'_{PUCCH+PUSCH}(i,k)$ and $PH_{PUSCH}(i,k)$ and $PH_{PUCCH}(i, k)$, which are respectively defined as the same as Items b and c;

or, the type and number of the power headroom which is measured by the user equipment on the subframe i and the component carrier k are configured by the higher layer signalling.

If multiple PUCCHs are transmitted on the component carrier k, and the transmission power of each PUCCH, which is estimated by the user equipment, is $P'_{PUCCH}(i,k,c)$[dBm], in which c∈C is the sequential number of each PUCCH on the component carrier k, then $$P'_{PUCCH}(i, k) = 10\log_{10}\left(\sum_{c \in C} 10^{P'_{PUCCH}(i,k,c)/10}\right) \text{ [dBm]}.$$

Part II. Reporting Power Headroom on Component Carrier

1) If the user equipment only transmits PUCCH on the subframe i and the component carrier k, and the user equipment has new uplink transmission on the subframe i, and there is an event triggering the reporting of the power headroom on the subframe i and the component carrier k, then according to a certain priority of logical channels, if the uplink resource allocated to the user equipment on the subframe i is enough to bear one power headroom MAC control element which is used for reporting the power headroom on the subframe i and the component carrier k and MAC protocol data unit (PDU) sub-header thereof, then the user equipment reports the power headroom on the subframe i and the component carrier k, on the subframe i;

otherwise, the user equipment does not report the power headroom on the subframe i and the component carrier k, on the subframe i.

Or, if the user equipment only transmits the PUSCH on the subframe i and the component carrier k, and the user equipment has new uplink transmission on the subframe i and the component carrier k, and there is an event triggering the reporting of the power headroom on the subframe i and the component carrier k, then according to a certain priority of logical channels, if the uplink resource allocated to the user equipment on the subframe i and the component carrier k is enough to bear one power headroom MAC control element which is used for reporting the power headroom on the subframe i and the component carrier k and MAC protocol data unit (PDU) sub-header thereof, then the user equipment reports the power headroom on the subframe i and the component carrier k, on the subframe i and the component carrier k;

otherwise, the user equipment does not report the power headroom on the subframe i and the component carrier k, on the subframe i.

The power headroom on the subframe i and the component carrier k, which is reported by the user equipment, is $PH_{PUSCH}(i,k)$.

2) If the user equipment only transmits PUCCH on the subframe i and the component carrier k, and the user equipment has new uplink transmission on the subframe i+n, and there is an event triggering the reporting of the power headroom on the subframe i and the component carrier k, then according to a certain priority of logical channels, if the uplink resource allocated to the user equipment on the subframe i+n is enough to bear one power headroom MAC control element which is used for reporting the power headroom on the subframe i and the component carrier k and MAC PDU sub-header thereof, then the user equipment reports the power headroom on the subframe i and the component carrier k, on the subframe i;

otherwise, the user equipment does not report the power headroom on the subframe i and the component carrier k, on the subframe i.

Specifically, the subframe i+n is the first subframe in which the user equipment has new uplink transmission, after the subframe i.

Or, if the user equipment only transmits PUCCH on the subframe i and the component carrier k, and the user equipment has new uplink transmission on the subframe i+n and the component carrier k, and there is an event triggering the reporting of the power headroom on the subframe i and the component carrier k, then according to a certain priority of logical channels, if the uplink resource allocated to the user equipment on the subframe i+n and the component carrier k is enough to bear one power headroom MAC control element which is used for reporting the power headroom on the subframe i and the component carrier k and MAC PDU sub-header thereof, then the user equipment reports the power headroom on the subframe i and the component carrier k, on the subframe i and the component carrier k;

otherwise, the user equipment does not report the power headroom on the subframe i and the component carrier k, on the subframe i.

Specifically, the subframe i+n is the first subframe in which the user equipment has new uplink transmission on the component carrier k, after the subframe i.

The power headroom on the subframe i and the component carrier k, which is reported by the user equipment, is $PH_{PUCCH}(i,j)$.

(3) For Item a or b:

if the user equipment simultaneously transmits the PUCCH and the PUSCH on the subframe i and the component carrier k, and the user equipment has new uplink transmission on the subframe i+n, and there is an event triggering the reporting of the power headroom on the subframe i and the component carrier k, then according to a certain priority of logical channels, if the uplink resource allocated to the user equipment on the subframe i is enough to bear one power headroom MAC control element which is used for reporting the power headroom on the subframe i and the component carrier k and MAC PDU sub-header thereof, then the user equipment reports the power headroom on the subframe i and the component carrier k, on the subframe i;

otherwise, the user equipment does not report the power headroom on the subframe i and the component carrier k, on the subframe i.

Or, if the user equipment simultaneously transmits the PUCCH and the PUSCH on the subframe i and the component carrier k, and the user equipment has new uplink transmission on the subframe i+n and the component carrier k, and there is an event triggering the reporting of the power headroom on the subframe i and the component carrier k, then according to a certain priority of logical channels, if the uplink resource allocated to the user equipment on the subframe i and the component carrier k is enough to bear one power headroom MAC control element which is used for reporting the power headroom on the subframe i and the component carrier k and MAC PDU sub-header thereof, then the user equipment reports the power headroom on the subframe i and the component carrier k, on the subframe i and the component carrier k;

otherwise, the user equipment does not report the power headroom on the subframe i and the component carrier k, on the subframe i.

The power headroom on the subframe i and the component carrier k, which is reported by the user equipment, is:

for a: $PH_{PUCCH+PUSCH}(i,k)$;

for b: $PH'_{PUCCH+PUSCH}(i,k)$;

for c-i:

if the user equipment simultaneously transmits the PUCCH and the PUSCH on the subframe i and the component carrier k, and the user equipment has new uplink transmission on the subframe i+n, and there is an event triggering the reporting of the power headroom on the subframe i and the component carrier k, then I: according to a certain priority of logical channels, if the uplink resource allocated to the user equipment on the subframe i is enough to bear two power headroom MAC control elements which are used for reporting the power headroom on the subframe i and the component carrier k and MAC PDU sub-header thereof, then the user equipment reports the power headroom on the subframe i and the component carrier k, on the subframe i;

II: or else, according to a certain priority of logical channels, if the uplink resource allocated to the user equipment on the subframe i is enough to bear one power headroom MAC control element which is used for reporting the power headroom on the subframe i and the component carrier k, then the user equipment reports the power headroom on the subframe i and the component carrier k, on the subframe i;

III: otherwise, the user equipment does not report the power headroom on the subframe i and the component carrier k, on the subframe i.

Or, if the user equipment simultaneously transmits the PUCCH and the PUSCH on the subframe i and the component carrier k, and the user equipment has new uplink transmission on the subframe i+n and the component carrier k, and there is an event triggering the reporting of the power headroom on the subframe i and the component carrier k, then I: according to a certain priority of logical channels, if the uplink resource allocated to the user equipment on the subframe i and the component carrier k is enough to bear two power headroom MAC control elements which are used for reporting the power headroom on the subframe i and the component carrier k and MAC PDU sub-header thereof, then the user equipment reports the power headroom on the subframe i and the component carrier k, on the subframe i and the component carrier k;

II: or else, according to a certain priority of logical channels, if the uplink resource allocated to the user equipment on the subframe i is enough to bear one power headroom MAC control element which is used for reporting the power headroom on the subframe i and the component carrier k, then the user equipment reports the power headroom on the subframe i and the component carrier k, on the subframe i and the component carrier k;

III: otherwise, the user equipment does not report the power headroom on the subframe i and the component carrier k, on the subframe i.

In the situation of I, the power headroom on the subframe i and the component carrier k, which is reported by the user equipment on the subframe i, is:

for c: $PH_{PUSCH}(i,k)$ and $PH_{PUCCH}(i,k)$;

for d: $PH_{PUCCH+PUSCH}(i,k)$ and $PH_{PUCCH}(i,k)$;

for e: $PH'_{PUCCH+PUSCH}(i,k)$ and $PH_{PUCCH}(i,k)$;

for f: $PH_{PUCCH+PUSCH}(i,k)$ and $PH_{PUSCH}(i,k)$;

for g: $PH'_{PUCCH+PUSCH}(i,j)$ and $PH_{PUSCH}(i,k)$;

for h: $PH_{PUSCH}(i,k)$ and $PH_{PUCCH}(i,k)$, or $PH_{PUCCH+PUSCH}(i,k)$ and $PH_{PUSCH}(i,k)$, or $PH_{PUCCH+PUSCH}(i,k)$ and $PH_{PUCCH}(i,k)$.

Specifically, when $PH_{PUCCH+PUSCH}(i,j) \geq 0$ or $PH_{PUCCH+PUSCH}(i,k) > 0$, the power headroom on the subframe i and the component carrier k, which is reported by the user equipment on the subframe i, is $PH_{PUSCH}(i,k)$ and $PH_{PUCCH}(i,k)$; and when $PH_{PUCCH+PUSCH}(i,k) < 0$ or $PH_{PUCCH+PUSCH}(i,k) \leq 0$, the power headroom on the subframe i and the component carrier k, which is reported by the user equipment on the subframe i, is $PH_{PUCCH+PUSCH}(i,k)$ and $PH_{PUSCH}(i,k)$, or $PH_{PUCCH+PUSCH}(i,k)$ and $PH_{PUCCH}(i,k)$.

Specifically, when $PH_{PUCCH+PUSCH}(i,j) \geq 0$ or $PH_{PUCCH+PUSCH}(i,k) > 0$, the power headroom on the subframe i and the component carrier k, which is reported by the user equipment on the subframe i, is $PH_{PUCCH+PUSCH}(i,k)$ and $PH_{PUSCH}(i,k)$, or $PH_{PUCCH+PUSCH}(i,k)$ and $PH_{PUCCH}(i,k)$; and when $PH_{PUCCH+PUSCH}(i,k) < 0$ or $PH_{PUCCH+PUSCH}(i,k) \leq 0$, the power headroom on the subframe i and the component carrier k, which is reported by the user equipment on the subframe i, is $PH_{PUSCH}(i,k)$ and $PH_{PUCCH}(i,k)$.

For i: $PH_{PUSCH}(i,k)$ and $PH_{PUCCH}(i,k)$, or $PH'_{PUCCH+PUSCH}(i,k)$ and $PH_{PUSCH}(i,k)$, or $PH'_{PUCCH+PUSCH}(i,k)$ and $PH_{PUCCH}(i,k)$;

specifically, when $PH'_{PUCCH+PUSCH}(i,k) \geq 0$ or $PH'_{PUCCH+PUSCH}(i,k) > 0$, the power headroom on the subframe i and the component carrier k, which is reported by the user equipment on the subframe i, is $PH'_{PUCCH+PUSCH}(i,k)$ and $PH_{PUSCH}(i,k)$, or $PH'_{PUCCH+PUSCH}(i,k)$ and $PH_{PUCCH}(i,k)$; and when $PH'_{PUCCH+PUSCH}(i,k) < 0$ or $PH'_{PUCCH+PUSCH}(i,k) \leq 0$, the power headroom on the subframe i and the component carrier k, which is reported by the user equipment on the subframe i, is $PH_{PUSCH}(i,k)$ and $PH_{PUCCH}(i,k)$.

Specifically, when $PH'_{PUCCH+PUSCH}(i,k) \geq 0$ or $PH'_{PUCCH+PUSCH}(i,k) > 0$, the power headroom on the subframe i and the component carrier k, which is reported by the user equipment on the subframe i, is $PH_{PUSCH}(i,k)$ and $PH_{PUCCH}(i,k)$; and when $PH'_{PUCCH+PUSCH}(i,k) < 0$ or $PH'_{PUCCH+PUSCH}(i,k) \leq 0$, the power headroom on the subframe i and the component carrier k, which is reported by the user equipment on the subframe i, is $PH'_{PUCCH+PUSCH}(i,j)$ and $PH_{PUSCH}(i,k)$, or $PH'_{PUCCH+PUSCH}(i,k)$ and $PH_{PUCCH}(i,k)$.

In the situation of II, the power headroom on the subframe i and the component carrier k, which is reported by the user equipment on the subframe i, is:

for c: $PH_{PUSCH}(i,k)$ or $PH_{PUCCH}(i,k)$;

for d: $PH_{PUCCH+PUSCH}(i,k)$ or $PH_{PUCCH}(i,k)$;

specifically, when $PH_{PUCCH+PUSCH}(i,j) \geq 0$ or $PH_{PUCCH+PUSCH}(i,k) > 0$, the power headroom on the subframe i and the component carrier k, which is reported by the user equipment on the subframe i, is $PH_{PUCCH+PUSCH}(i,k)$; and when $PH_{PUCCH+PUSCH}(i,k) < 0$ or $PH_{PUCCH+PUSCH}(i,k) \leq 0$, the power headroom on the subframe i and the component carrier k, which is reported by the user equipment on the subframe i, is $PH_{PUCCH}(i,k)$.

Specifically, when $PH_{PUCCH+PUSCH}(i,j) \geq 0$ or $PH_{PUCCH+PUSCH}(i,k) > 0$, the power headroom on the subframe i and the component carrier k, which is reported by the user equipment on the subframe i, is $PH_{PUCCH}(i,k)$; and when $PH_{PUCCH+PUSCH}(i,k) < 0$ or $PH_{PUCCH+PUSCH}(i,k) \leq 0$, the power headroom on the subframe i and the component carrier k, which is reported by the user equipment on the subframe i, is $PH_{PUCCH+PUSCH}(i,k)$.

For e: $PH'_{PUCCH+PUSCH}(i,j)$ or $PH_{PUCCH}(i,k)$;

specifically, when $PH'_{PUCCH+PUSCH}(i,k) \geq 0$ or $PH'_{PUCCH+PUSCH}(i,k) > 0$, the power headroom on the subframe i and the component carrier k, which is reported by the user equipment on the subframe i, is $PH'_{PUCCH+PUSCH}(i,k)$;

when $PH'_{PUCCH+PUSCH}(i,k) < 0$ or $PH'_{PUCCH+PUSCH}(i,k) \leq 0$, the power headroom on the subframe i and the component carrier k, which is reported by the user equipment on the subframe i, is $PH_{PUCCH}(i,k)$.

Specifically, when $PH'_{PUCCH+PUSCH}(i,k) \geq 0$ or $PH'_{PUCCH+PUSCH}(i,k) > 0$, the power headroom on the subframe i and the component carrier k, which is reported by the user equipment on the subframe i, is $PH_{PUCCH}(i,k)$;

when $PH'_{PUCCH+PUSCH}(i,k) < 0$ or $PH'_{PUCCH+PUSCH}(i,k) \leq 0$, the power headroom on the subframe i and the component carrier k, which is reported by the user equipment on the subframe i, is $PH'_{PUCCH+PUSCH}(i,k)$.

For f: $PH_{PUCCH+PUSCH}(i,k)$ or $PH_{PUSCH}(i,k)$;

specifically, when $PH_{PUCCH+PUSCH}(i,j) \geq 0$ or $PH_{PUCCH+PUSCH}(i,k) > 0$, the power headroom on the subframe i and the component carrier k, which is reported by the user equipment on the subframe i, is $PH_{PUSCH}(i,k)$;

when $PH_{PUCCH+PUSCH}(i,k) < 0$ or $PH_{PUCCH+PUSCH}(i,k) \leq 0$, the power headroom on the subframe i and the component carrier k, which is reported by the user equipment on the subframe i, is $PH_{PUCCH+PUSCH}(i,k)$.

Specifically, when $PH_{PUCCH+PUSCH}(i,j) \geq 0$ or $PH_{PUCCH+PUSCH}(i,k) > 0$, the power headroom on the subframe i and the component carrier k, which is reported by the user equipment on the subframe i, is $PH_{PUCCH+PUSCH}(i,k)$;

when $PH_{PUCCH+PUSCH}(i,k) < 0$ or $PH_{PUCCH+PUSCH}(i,k) \leq 0$, the power headroom on the subframe i and the component carrier k, which is reported by the user equipment on the subframe i, is $PH_{PUSCH}(i,k)$.

For g: $PH'_{PUCCH+PUSCH}(i,k)$ or $PH_{PUSCH}(i,k)$;

specifically, when $PH'_{PUCCH+PUSCH}(i,k) \geq 0$ or $PH'_{PUCCH+PUSCH}(i,k) > 0$, the power headroom on the subframe i and the component carrier k, which is reported by the user equipment on the subframe i, is $PH_{PUSCH}(i,k)$;

when $PH'_{PUCCH+PUSCH}(i,k) < 0$ or $PH'_{PUCCH+PUSCH}(i,k) \leq 0$, the power headroom on the subframe i and the component carrier k, which is reported by the user equipment on the subframe i, is $PH'_{PUCCH+PUSCH}(i,k)$.

Specifically, when $PH'_{PUCCH+PUSCH}(i,k) \geq 0$ or $PH'_{PUCCH+PUSCH}(i,k) > 0$, the power headroom on the subframe i and the component carrier k, which is reported by the user equipment on the subframe i, is $PH'_{PUCCH+PUSCH}(i,k)$;

when $PH'_{PUCCH+PUSCH}(i,k) < 0$ or $PH'_{PUCCH+PUSCH}(i,k) \leq 0$, the power headroom on the subframe i and the component carrier k, which is reported by the user equipment on the subframe i, is $PH_{PUSCH}(i,k)$.

For h: $PH_{PUSCH}(i,j)$ or $PH_{PUCCH}(i,k)$ or $PH_{PUCCH+PUSCH}(i,k)$;

specifically, when $PH_{PUCCH+PUSCH}(i,j) \geq 0$ or $PH_{PUCCH+PUSCH}(i,k) > 0$, the power headroom on the subframe i and the component carrier k, which is reported by the user equipment on the subframe i, is $PH_{PUSCH}(i,k)$ or $PH_{PUCCH}(i,k)$;

when $PH_{PUCCH+PUSCH}(i,k) < 0$ or $PH_{PUCCH+PUSCH}(i,k) \leq 0$, the power headroom on the subframe i and the component carrier k, which is reported by the user equipment on the subframe i, is $PH_{PUCCH+PUSCH}(i,k)$.

Specifically, when $PH_{PUCCH+PUSCH}(i,j) \geq 0$ or $PH_{PUCCH+PUSCH}(i,k) > 0$, the power headroom on the subframe i and the component carrier k, which is reported by the user equipment on the subframe i, is $PH_{PUCCH+PUSCH}(i,k)$;

when $PH_{PUCCH+PUSCH}(i,k)<0$ or $PH_{PUCCH+PUSCH}(i,k) \leq 0$, the power headroom on the subframe i and the component carrier k, which is reported by the user equipment on the subframe i, is $PH_{PUSCH}(i,k)$ or $PH_{PUCCH}(i,k)$.

For i: $PH_{PUSCH}(i,k)$ or $PH_{PUCCH}(i,k)$ or $PH'_{PUCCH+PUSCH}(i,k)$;

specifically, when $PH'_{PUCCH+PUSCH}(i,k) \geq 0$ or $PH'_{PUCCH+PUSCH}(i,k)>0$, the power headroom on the subframe i and the component carrier k, which is reported by the user equipment on the subframe i, is $PH'_{PUCCH+PUSCH}(i,k)$;

when $PH'_{PUCCH+PUSCH}(i,k)<0$ or $PH'_{PUCCH+PUSCH}(i,k) \leq 0$, the power headroom on the subframe i and the component carrier k, which is reported by the user equipment on the subframe i, is $PH_{PUSCH}(i,k)$ or $PH_{PUCCH}(i,k)$.

Specifically, when $PH'_{PUCCH+PUSCH}(i,k) \geq 0$ or $PH'_{PUCCH+PUSCH}(i,k)>0$, the power headroom on the subframe i and the component carrier k, which is reported by the user equipment on the subframe i, is $PH_{PUSCH}(i,k)$ or $PH_{PUCCH}(i,k)$;

when $PH'_{PUCCH+PUSCH}(i,k)<0$ or $PH'_{PUCCH+PUSCH}(i,k) \leq 0$, power headroom on the subframe i and the component carrier k, which is reported by the user equipment on the subframe i, is $PH'_{PUCCH+PUSCH}(i,j)$.

Or, in the situation of I and II, the type of power headroom on the subframe i and the component carrier k, which is reported by the user equipment, is configured by the higher layer signalling.

The user equipment indicates the type of reported power headroom while reporting the power headroom to the base station, wherein the user equipment reports the power headroom through the power headroom MAC control element.

Furthermore, the user equipment indicates the type of the reported power headroom in the power headroom MAC control element while reporting the power headroom to the base station.

Furthermore, the highest bit and/or the secondarily highest bit in the power headroom MAC control element are/is used for indicating the type of the reported power headroom.

For example, the highest bit or the secondarily highest bit in the power headroom MAC control element is set as 0 to indicate the reported power headroom is $PH_{PUSCH}(i,k)$.

The highest bit or the secondarily highest bit in the power headroom MAC control element is set as 1 to indicate the reported power headroom is $PH_{PUCCH}(i,k)$.

Or, the highest bit or the secondarily highest bit in the power headroom MAC control element is set as 0 to indicate the reported power headroom is $PH_{PUSCH}(i,k)$.

Set the highest bit or the secondarily highest bit in the power headroom MAC control element as 1 to indicate the reported power headroom is $PH_{PUCCH+PUSCH}(i,k)$ (or $PH'_{PUCCH+PUSCH}(i,k)$).

Or, the highest two bits in the power headroom MAC control element as are set as 00 to indicate the reported power headroom is $PH_{PUSCH}(i,k)$.

The highest two bits in the power headroom MAC control element are set as 01 or 10 or 11 to indicate the reported power headroom is $PH_{PUCCH}(i,k)$.

Or, the highest two bits in the power headroom MAC control element ate set as 00 to indicate the reported power headroom is $PH_{PUSCH}(i,k)$.

The highest two bits in the power headroom MAC control element are set as 10 or 11 or 01 to indicate the reported power headroom is $PH_{PUCCH+PUSCH}(i,k)$ (or $PH'_{PUCCH+PUSCH}(i,k)$).

Or, the highest two bits in the power headroom MAC control element are set as 00 to indicate the reported power headroom is $PH_{PUSCH}(i,k)$.

The highest two bits in the power headroom MAC control element are set as 01 or 10 or 11 to indicate the reported power headroom is $PH_{PUCCH}(i,k)$.

The highest two bits in the power headroom MAC control element are set as 10 or 11 or 01 to indicate the reported power headroom is $PH_{PUCCH+PUSCH}(i,k)$ (or $PH'_{PUCCH+PUSCH}(i,k)$).

Embodiment 1

It is assumed that a LTE-A system runs in a frequency division duplex (FDD) mode, and there are two downlink component carriers D1 and D2, and two uplink component carries U1 and U2 in the system.

A user equipment supports sending uplink signals on the U1 and U2.

The user equipment measures the power headroom on the component carries U1 and U2, respectively.

Assuming that the user equipment only transmits the PUSCH on the subframe i and the component carrier U1, the user equipment measures the power headroom PH(i,1) on the subframe i and the component carrier U1.

Assuming that the transmission power of PUSCH on the subframe i and the component carrier U1, which is estimated by the user equipment, is $P'_{PUSCH}(i,1)$, and the configured maximum output power which is set by the user equipment on the subframe i and the component carrier U1 is $P_{CMAX}(1)$, then the power headroom which is measured by the user equipment on the subframe i and the component carrier U1 is:

$$PH(i,1)=P_{CMAX}(1)-P'_{PUSCH}(i,1)[dB].$$

Assuming that the user equipment only transmits the PUSCH on the subframe i and the component carrier U2, the user equipment measures the power headroom $PH_{PUSCH}(i,2)$ on the subframe i and the component carrier U2.

Assuming that the transmission power of PUSCH on the subframe i and the component carrier U2, which is estimated by the user equipment, is $P'_{PUSCH}(i,2)$, and the configured maximum output power which is set by the user equipment on the subframe i and the component carrier U2 is $P_{CMAX}(2)$, then the power headroom which is measured by the user equipment on the subframe i and the component carrier U2 is:

$$PH_{PUSCH}(i,2)=P_{CMAX}(2)-P'_{PUSCH}(i,2)[dB].$$

Assuming that the user equipment simultaneously transmits the PUSCH and the PUCCH on the subframe i and the component carrier U2, the user equipment measures the power headroom on the subframe i and the component carrier U2.

Assuming that the transmission power of PUSCH on the subframe i and the component carrier U2, which is estimated by the user equipment, is $P'_{PUSCH}(i,2)$, the estimated transmission power of $P'_{PUCCH}(i,2)$, and the configured maximum output power which is set by the user equipment on the subframe i and the component carrier U2 is $P_{CMAX}(2)$, then the power headroom which is measured by the user equipment on the subframe i and the component carrier U2 is:

$$PH_{PUCCH+PUSCH}(i, 2) = 10\log_{10}\left(10^{P_{CMAX}(2)/10} - 10^{P'_{PUCCH}(i,2)/10}\right) - P'_{PUSCH}(i, 2)$$

$$= 10\log_{10}\left(\frac{10^{P_{CMAX}(2)/10} - 10^{P'_{PUCCH}(i,2)/10}}{10^{P'_{PUSCH}(i,2)/10}}\right) \text{ [dB]}$$

or $$PH'_{PUCCH+PUSCH}(i, 2) = P_{CMAX}(2) - 10\log_{10}\left(10^{P'_{PUSCH}(i,2)/10} + 10^{P'_{PUCCH}(i,2)/10}\right)$$

$$= 10\log_{10}\left(\frac{10^{P_{CMAX}(2)/10}}{10^{P'_{PUSCH}(i,2)/10} + 10^{P'_{PUCCH}(i,2)/10}}\right) \text{ [dB]}.$$

If the user equipment determines to report the power headroom on the subframe i and the component carrier U2, on the subframe i, then according to a certain priority of logical channels, if the uplink resource allocated to the user equipment on the subframe i is enough to bear one power headroom MAC control element which is used for reporting the power headroom on the subframe i and the component carrier U2, then the power headroom on the subframe i and the component carrier U2, which is reported by the user equipment on the subframe i, is $PH_{PUCCH+PUSCH}(i,2)$ or $PH'_{PUCCH+PUSCH}(i,2)$;

otherwise, the user equipment does not report the power headroom on the subframe i and the component carrier U2, on the subframe i.

The user equipment reports the power headroom through the power headroom MAC control element. The user equipment indicates the type of the reported power headroom while reporting the power headroom to the base station. In this case, the highest bit and/or the secondarily highest bit in the power headroom MAC control element are/is used for indicating the type of the reported power headroom.

The highest two bits in the power headroom MAC control element are set as 00 to indicate the reported power headroom is $PH_{PUSCH}(i,k)$.

The highest two bits in the power headroom MAC control element are set as 01 (or 10 or 11) to indicate the reported power headroom is $PH_{PUCCH+PUSCH}(i,k)$.

Or, the highest two bits in the power headroom MAC control element are set as 01 (or 10 or 11) to indicate the reported power headroom is $PH_{PUCCH+PUSCH}(i,k)$.

Or, the highest bit or the secondarily highest bit in the power headroom MAC control element are set as 0 to indicate the reported power headroom is $PH_{PUSCH}(i,k)$.

The highest bit or the secondarily highest bit in the power headroom MAC control element is set as 1 to indicate the reported power headroom is $PH_{PUCCH+PUSCH}(i,k)$ (or $PH'_{PUCCH+PUSCH}(i,k)$).

Embodiment 2

It is assumed that a LTE-A system runs in a frequency division duplex mode, and there are two downlink component carriers D1 and D2, and two uplink component carries U1 and U2 in the system.

A user equipment supports sending uplink signals on the U1 and U2.

The user equipment measures the power headroom on the component carries U1 and U2, respectively.

Assuming that the user equipment simultaneously transmits the PUSCH and the PUCCH on the subframe i and the component carrier U2, the user equipment measures the power headroom on the subframe i and the component carrier U2.

Assuming that the transmission power of PUSCH on the subframe i and the component carrier U2, which is estimated by the user equipment, is $P'_{PUSCH}(i,2)$, the estimated transmission power of $P'_{PUCCH}(i,2)$, and the configured maximum output power which is set by the user equipment on the subframe i and the component carrier U2 is $P_{CMAX}(2)$, then the power headroom which is measured by the user equipment on the subframe i and the component carrier U2 is $PH_{PUCCH}(i,2)$ and $PH_{PUSCH}(i,2)$:

$$PH_{PUCCH}(i,2)=P_{CMAX}(2)-P'_{PUCCH}(i,2)\text{[dB]},$$

$$PH_{PUSCH}(i,2)=P_{CMAX}(2)-P'_{PUSCH}(i,2)\text{[dB]}.$$

If the user equipment determines to report the power headroom on the subframe i and the component carrier U2, on the subframe i, then according to a certain priority of logical channels, if the uplink resource allocated to the user equipment on the subframe i is enough to bear two power headroom MAC control elements which are used for reporting the power headroom on the subframe i and the component carrier U2, then the power headroom on the subframe i and the component carrier U2, which is reported by the user equipment on the subframe i, is $PH_{PUCCH}(i,2)$ and $PH_{PUSCH}(i,2)$;

or else, according to a certain priority of logical channels, if the uplink resource allocated to the user equipment on the subframe i is enough to bear one power headroom MAC control element which is used for reporting the power headroom on the subframe i and the component carrier U2, then the power headroom on the subframe i and the component carrier U2, which is reported by the user equipment on the subframe i, is $PH_{PUCCH}(i,2)$ or $PH_{PUSCH}(i,2)$;

otherwise, the user equipment does not report the power headroom on the subframe i and the component carrier U2, on the subframe i.

The user equipment reports the power headroom through the power headroom MAC control element. The user equipment indicates the type of the reported power headroom while reporting the power headroom to the base station. In this case, the highest bit and/or the secondarily highest bit in the power headroom MAC control element are/is used for indicating the type of the reported power headroom.

The highest two bits in the power headroom MAC control element are set as 00 to indicate the reported power headroom is $PH_{PUSCH}(i,k)$.

The highest two bits in the power headroom MAC control element are set as 01 (or 10 or 11) to indicate the reported power headroom is $PH_{PUCCH}(i,k)$.

Or, the highest bit or the secondarily highest bit in the power headroom MAC control element is set as 0 to indicate the reported power headroom is $PH_{PUSCH}(i,k)$.

The highest bit or the secondarily highest bit in the power headroom MAC control element is set as 1 to indicate the reported power headroom is $PH_{PUCCH}(i,k)$.

Embodiment 3

It is assumed that a LTE-A system runs in a frequency division duplex mode, and there are two downlink component carriers D1 and D2, and two uplink component carries U1 and U2 in the system.

A user equipment supports sending uplink signals on the U1 and U2.

The user equipment measures the power headroom on the component carries U1 and U2, respectively.

Assuming that the user equipment simultaneously transmits the PUSCH and the PUCCH on the subframe i and the component carrier U2, the user equipment measures the power headroom on the subframe i and the component carrier U2.

Assuming that the transmission power of PUSCH on the subframe i and the component carrier U2, which is estimated by the user equipment is $P'_{PUSCH}(i,2)$, the estimated transmission power of $P'_{PUCCH}(i,2)$, and the configured maximum output power which is set by the user equipment on the subframe i and the component carrier U2 is $P_{CMAX}(2)$, then the power headroom which is measured by the user equipment on the subframe i and the component carrier U2 is $PH_{PUSCH}(i,2)$ and $PH_{PUCCH+PUSCH}(i,2)$:

$$PH_{PUSCH}(i,2) = P_{CMAX}(2) - P'_{PUSCH}(i,2)[dB],$$

$$PH_{PUCCH+PUSCH}(i,2) = 10\log_{10}(10^{P_{CMAX}(2)/10} - 10^{P'PUCCH(i,2)/10}) - P'_{PUSCH}(i,2)[dB].$$

If the user equipment determines to report the power headroom on the subframe i and the component carrier U2, on the subframe i, then according to a certain priority of logical channels, if the uplink resource allocated to the user equipment on the subframe i is enough to bear two power headroom MAC control elements which are used for reporting the power headroom on the subframe i and the component carrier U2, then the power headroom on the subframe i and the component carrier U2, which is reported by the user equipment on the subframe i, is $PH_{PUSCH}(i,2)$ and $PH_{PUCCH+PUSCH}(i,2)$;

or else, according to a certain priority of logical channels, if the uplink resource allocated to the user equipment on the subframe i is enough to bear one power headroom MAC control element which is used for reporting the power headroom on the subframe i and the component carrier U2, then the power headroom on the subframe i and the component carrier U2, which is reported by the user equipment on the subframe i, is $PH_{PUSCH}(i,2)$ or $PH_{PUCCH+PUSCH}(i,2)$;

specifically, when $PH_{PUCCH+PUSCH}(i,2) \geq 0$ or $PH_{PUCCH+PUSCH}(i,2) > 0$, the power headroom on the subframe i and the component carrier U2, which is reported by the user equipment on the subframe i, is $PH_{PUSCH}(i,2)$; and when $PH_{PUCCH+PUSCH}(i,2) < 0$ or $PH_{PUCCH+PUSCH}(i,2) \leq 0$, the power headroom on the subframe i and the component carrier U2, which is reported by the user equipment on the subframe i is $PH_{PUCCH+PUSCH}(i,k)$;

otherwise, the user equipment does not report the power headroom on the subframe i and the component carrier U2, on the subframe i.

The user equipment reports the power headroom through the power headroom MAC control element. The user equipment indicates the type of the reported power headroom while reporting the power headroom to the base station. In this case, the highest bit and/or the secondarily highest bit in the power headroom MAC control element are/is used for indicating the type of the reported power headroom.

The highest two bits in the power headroom MAC control element are set as 00 to indicate the reported power headroom is $PH_{PUSCH}(i,k)$.

The highest two bits in the power headroom MAC control element are set as 01 (or 10 or 11) to indicate the reported power headroom is $PH_{PUCCH+PUSCH}(i,k)$.

Or, the highest bit or the secondarily highest bit in the power headroom MAC control element is set as 0 to indicate the reported power headroom is $PH_{PUSCH}(i,k)$.

The highest bit or the secondarily highest bit in the power headroom MAC control element is set as 1 to indicate the reported power headroom is $PH_{PUCCH+PUSCH}(i,k)$.

Embodiment 4

It is assumed that a LTE-A system runs in a frequency division duplex mode, and there are two downlink component carriers D1 and D2, and two uplink component carries U1 and U2 in the system.

A user equipment supports sending uplink signals on the U1 and U2.

The user equipment measures the power headroom on the component carries U1 and U2, respectively.

Assuming that the user equipment simultaneously transmits the PUSCH and the PUCCH on the subframe i and the component carrier U2, the user equipment measures the power headroom on the subframe i and the component carrier U2.

Assuming that the transmission power of PUSCH on the subframe i and the component carrier U2, which is estimated by the user equipment, is $P'_{PUSCH}(i,2)$, the estimated transmission power of PUCCH is $P'_{PUCCH}(i,2)$, and the configured maximum output power which is set by the user equipment on the subframe i and the component carrier U2 is $P_{CMAX}(2)$, then the power headroom which is measured by the user equipment on the subframe i and the component carrier U2 is $PH_{PUCCH}(i,2)$, $PH_{PUSCH}(i,2)$ and $PH'_{PUCCH+PUSCH}(i,2)$:

$$PH_{PUCCH}(i,2) = P_{CMAX}(2) - P'_{PUCCH}(i,2)[dB],$$

$$PH_{PUSCH}(i,2) = P_{CMAX}(2) - P'_{PUSCH}(i,2)[dB],$$

$$PH'_{PUCCH+PUSCH}(i,2) = P_{CMAX}(2) - 10\log_{10}(10^{P'PUSCH(i,2)/10} + 10^{P'PUCCH(i,2)/10})[dB].$$

If the user equipment determines to report the power headroom on the subframe i and the component carrier U2, on the subframe i, then according to a certain priority of logical channels, if the uplink resource allocated to the user equipment on the subframe i is enough to bear two power headroom MAC control elements which are used for reporting the power headroom on the subframe i and the component carrier U2, then the power headroom on the subframe i and the component carrier U2, which is reported by the user equipment on the subframe i, is $PH_{PUSCH}(i,2)$ and $PH_{PUCCH}(i,2)$, or $PH'_{PUCCH+PUSCH}(i,2)$ and $PH_{PUSCH}(i,2)$, or $PH'_{PUCCH+PUSCH}(i,2)$ and $PH_{PUCCH}(i,2)$;

specifically, when $PH'_{PUCCH+PUSCH}(i,2) \geq 0$ or $PH'_{PUCCH+PUSCH}(i,2) > 0$, the power headroom on the subframe i and the component carrier U2, which is reported by the user equipment on the subframe i is $PH_{PUSCH}(i,2)$ and $PH_{PUCCH}(i,2)$; and when $PH'_{PUCCH+PUCCH}(i,2) < 0$ or $PH'_{PUCCH+PUSCH}(i,2) \leq 0$, the power headroom on the subframe i and the component carrier U2, which is reported by the user equipment on the subframe i is $PH'_{PUCCH+PUSCH}(i,2)$ and $PH_{PUSCH}(i,2)$, or $PH'_{PUCCH+PUSCH}(i,2)$ and $PH_{PUCCH}(i,2)$;

or else, according to a certain priority of logical channels, if the uplink resource allocated to the user equipment on the subframe i is enough to bear one power headroom MAC control element which is used for reporting the power headroom on the subframe i and the component carrier U2, then the power headroom on the subframe i and the component carrier U2, which is reported by the user equipment on the subframe i, is $PH_{PUSCH}(i,2)$ or $PH_{PUCCH}(i,2)$ or $PH'_{PUCCH+PUSCH}(i,2)$;

specifically, when $PH'_{PUCCH+PUSCH}(i,2) \geq 0$ or $PH'_{PUCCH+PUSCH}(i,2) > 0$, the power headroom on the subframe i and the component carrier k, which is reported by the user equipment on the subframe i is $PH_{PUSCH}(i,2)$; and when $PH'_{PUCCH+PUSCH}(i,2) < 0$ or $PH'_{PUCCH+PUSCH}(i,2) \leq 0$, the power headroom on the subframe i and the component carrier k, which is reported by the user equipment on the subframe i is $PH'_{PUCCH+PUSCH}(i,2)$.

otherwise, the user equipment does not report the power headroom on the subframe i and the component carrier U2, on the subframe i.

The user equipment reports the power headroom through the power headroom MAC control element. The user equipment indicates the type of the reported power headroom while reporting the power headroom to the base station. In this case, the highest two bits in the power headroom MAC control element are used for indicating the type of the reported power headroom.

The highest two bits in the power headroom MAC control element are set as 00 to indicate the reported power headroom is $PH_{PUSCH}(i,k)$.

The highest two bits in the power headroom MAC control element are set as 01 to indicate the reported power headroom is $PH_{PUCCH}(i,k)$.

The highest two bits in the power headroom MAC control element are set as 10 or 11 to indicate the reported power headroom is $PH'_{PUCCH+PUSCH}(i,k)$.

Embodiment 5

It is assumed that a LTE-A system runs in the TDD mode, and there are five component carries C0, C1, C2, C3 and C4 in the system, in which C0 and C1 are in the same frequency band, C2 is in another frequency band, C3 and C4 are in the third frequency band.

A user equipment supports sending uplink signals on the C0, C1, C2, C3 and C4.

The user equipment measures the power headroom on the component carries C0, C1, C2, C3 and C4, respectively.

Assuming that the user equipment only transmits the PUSCH on the subframe i and the component carrier $C_k$, the user equipment measures the power headroom $PH_{PUSCH}(i,k)$ on the subframe i and the component carrier $C_k$, wherein k=0, 1, 2, 3, 4.

Assuming that the transmission power of PUSCH on the subframe i and the component carrier $C_k$, which is estimated by the user equipment, is $P'_{PUSCH}(i,k)$, and the configured maximum output power which is set by the user equipment on the subframe i and the component carrier $C_k$ is $P_{CMAX}(k)$, then the power headroom which is measured by the user equipment on the subframe i and the component carrier $C_k$ is $$PH_{PUSCH}(i,k) = P_{CMAX}(k) - P'_{PUSCH}(i,k) [\text{dB}].$$

Assuming that the user equipment only transmits the PUCCH on the subframe i and the component carrier $C_k$, the user equipment measures the power headroom $PH_{PUCCH}(i,k)$ on the subframe i and the component carrier $C_k$.

If the user equipment only transmits the PUSCH on the subframe i and the component carrier k, and the user equipment has new uplink transmission on the subframe i and the component carrier k, and there is an event triggering the reporting of the power headroom on the subframe i and the component carrier k, then according to a certain priority of logical channels, if the uplink resource allocated to the user equipment on the subframe i and the component carrier k is enough to bear one power headroom MAC control element which is used for reporting the power headroom on the subframe i and the component carrier k and MAC protocol data unit (PDU) sub-header thereof, then the user equipment reports the power headroom on the subframe i and the component carrier k, on the subframe i and the component carrier k;

otherwise, the user equipment does not report the power headroom on the subframe i and the component carrier k, on the subframe i.

The power headroom on the subframe i and the component carrier k, which is reported by the user equipment is $PH_{PUSCH}(i,k)$.

Assuming that the transmission power of PUCCH on the subframe i and the component carrier $C_k$, which is estimated by the user equipment, is $P'_{PUCCH}(i,k)$, and the configured maximum output power which is set by the user equipment on the subframe i and the component carrier $C_k$ is $P_{CMAX}(k)$, then the power headroom which is measured by the user equipment on the subframe i and the component carrier $C_k$ is $$PH_{PUCCH}(i,k) = P_{CMAX}(k) - P'_{PUCCH}(i,k) [\text{dB}].$$

Assuming that the user equipment transmits three PUCCHs (channels) on the subframe i and the component carrier $C_k$, the estimated transmission powers are $P'_{PUCCH}(i,k,0)$ $P'_{PUCCH}(i,k,1)$ and $P'_{PUCCH}(i,k,2)$, respectively, then $$P'_{PUCCH}(i,k) = 10 \log_{10}(10^{P'_{PUCCH}(i,k,0)/10} + 10^{P'_{PUCCH}(i,k,1)/10} + 10^{P'_{PUCCH}(i,k,2)/10}) [\text{dBm}].$$

If the user equipment only transmits the PUCCH on the subframe i and the component carrier $C_k$, and the user equipment has new uplink transmission on the subframe i+n and the component carrier $C_k$, and there is an event triggering the reporting of the power headroom on the subframe i and the component carrier $C_k$, then according to a certain priority of logical channels, if the uplink resource allocated to the user equipment on the subframe i+n and the component carrier $C_k$ is enough to bear one power headroom MAC control element which is used for reporting the power headroom on the subframe i and the component carrier $C_k$ and MAC PDU sub-header thereof, then the user equipment reports the power headroom on the subframe i and the component carrier $C_k$, on the subframe i and the component carrier $C_k$;

otherwise, the user equipment does not report the power headroom on the subframe i and the component carrier $C_k$, on the subframe i.

Specifically, the subframe i+n is the first subframe in which the user equipment has new uplink transmission after the first component carrier $C_k$, and the power headroom on the subframe i and the component carrier group j, which is reported by the user equipment, is $PH_{PUCCH}(i,k)$.

Assuming that a user equipment simultaneously transmits the PUSCH and the PUCCH on the subframe i and the component carrier $C_k$, the user equipment measures the power headroom on the subframe i and the component carrier $C_k$.

Assuming that the transmission power of PUSCH on the subframe i and the component carrier $C_k$, which is estimated by the user equipment, is $P'_{PUSCH}(i,k)$, the estimated transmission power of $PUCCH_k$ is $P'_{PUCCH}(i,k)$, and the configured maximum output power which is set by the user equipment on the subframe i and the component carrier $C_k$ is $P_{CMAX}(k)$, then the power headroom which is measured by the user equipment on the subframe i and the component carrier $C_k$ is $$PH_{PUCCH}(i,k) = P_{CMAX}(k) - P'_{PUCCH}(i,k) [\text{dB}],$$

$$PH_{PUSCH}(i,k) = P_{CMAX}(k) - P'_{PUSCH}(i,k) [\text{dB}].$$

If the user equipment simultaneously the PUSCH and the PUCCH on the subframe i and the component carrier k, and the user equipment has new uplink transmission on the subframe i and the component carrier k, and there is an event triggering the reporting of the power headroom on the subframe i and the component carrier k, then according to a certain priority of logical channels, if uplink resource allocated to the user equipment on the subframe i is enough to bear two power headroom MAC control elements which are used for reporting the power headroom on the subframe i and the component carrier $C_k$, then the power headroom on the subframe i and the component carrier $C_k$, which is reported by the user equipment on the subframe i, is $PH_{PUCCH}(i,k)$ and $PH_{PUSCH}(i,k)$;

or else, according to a certain priority of logical channels, if uplink resource allocated to the user equipment on the subframe i is enough to bear one power headroom MAC control element which is used for reporting the power headroom on the subframe i and the component carrier $C_k$, then the power headroom on the subframe i and the component carrier $C_k$, which is reported by the user equipment on the subframe i is $PH_{PUSCH}(i,k)$;

otherwise, the user equipment does not report the power headroom on the subframe i and the component carrier $C_k$, on the subframe i.

The user equipment reports the power headroom through the power headroom MAC control element. The user equipment indicates the type of the reported power headroom while reporting the power headroom to the base station. In this case, the highest bit and/or the secondarily highest bit in the power headroom MAC control element are/is used for indicating the type of the reported power headroom.

The highest two bits in the power headroom MAC control element are set as 00 to indicate the reported power headroom is $PH_{PUSCH}(i,k)$.

The highest two bits in the power headroom MAC control element are set as 01 (or 10 or 11) to indicate the reported power headroom is $PH_{PUCCH}(i,k)$.

Or, the highest bit or the secondarily highest bit in the power headroom MAC control element is set as 0 to indicate the reported power headroom is $PH_{PUSCH}(i,k)$.

The highest bit or the secondarily highest bit in the power headroom MAC control element is set as 1 to indicate the reported power headroom is $PH_{PUCCH+PUSCH}(i,k)$.

Figure 4:
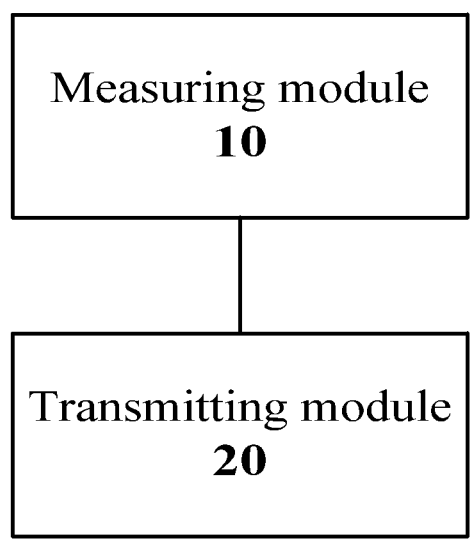
FIG. 4 shows a diagram of a terminal according to the embodiment of the present invention.

FIG. 4 shows a diagram of a terminal according to the embodiment of the present invention, comprising:

a measuring module 10, configured for measuring the power headroom on the subframe and the component carrier group, when transmitting the PUSCH and/or the PUCCH on the subframe and the component carrier group; and a transmitting module 20, configured for reporting the power headroom to the base station, and indicating the type of reported power headroom while reporting.

The terminal of this embodiment uses the method for processing power headroom of the above embodiments to measure the power headroom and type thereof, and to report the measured power headroom and type thereof to the base station.

It can be seen from the description above that the invention realizes the following technical effects:

(1) it solves the problem of measuring power headroom in the LTE-A system which adopts carrier aggregation, and thereby achieves measurement and reporting of power headroom of the terminal after adopting the carrier aggregation; and (2) because the terminal also reports the type of power headroom while reporting the power headroom, the invention solves the problem in the related art that the reported power headroom cannot be distinguished; and thus the type to which the power headroom belongs is indicated specifically by reporting the type while reporting the power headroom, avoiding confusion.

Obviously, those skilled in the art should know that these modules and steps above of the present invention can be implemented by a general computing device, and they can be concentrated on single computing device or distributed on network composed of multiple computing devices. Optionally, they can be implemented by the computing device executable program code. Thereby, they can be stored in storage device to be executed by the computing device. Under some conditions, the illustrated or described steps can be executed in a different order. Or these modules and steps can be implemented by making them into integrated circuit modules, respectively, or by making multiple modules or steps into a single integrated circuit module. Thus, the invention is not limited to any specific combination of hardware and software.

The above is only the preferred embodiments of the present invention and is not intended to limit the invention. For those skilled in the art, the invention may have various modifications and changes. Any modifications, equivalent replacements, improvements and the like within the spirit and principle of the present invention shall fall within the scope of protection of the present invention.

What is claimed is:

1. A method for processing power headroom, comprising:
when transmitting a physical uplink shared channel (PUSCH) and/or a physical uplink control channel (PUCCH) on a subframe and a component carrier group, a terminal measuring a power headroom on the subframe and the component carrier group; and
the terminal reporting the power headroom to a base station and indicating the type of the reported power headroom when reporting;
wherein when the terminal simultaneously transmits the PUSCH and the PUCCH on the subframe and the component carrier group, the measured power headroom on the subframe and the component carrier group is one of:
$PH_{PUCCH+PUSCH}(i,j)$; $PH'_{PUCCH+PUSCH}(i,j)$; $PH_{PUSCH}(i,j)$ and $PH_{PUCCH}(i,j)$; $PH_{PUCCH+PUSCH}(i,j)$ and $PH_{PUCCH}(i,j)$; $PH'_{PUCCH+PUSCH}(i,j)$ and $PH_{PUCCH}(i,j)$; $PH_{PUCCH+PUSCH}(i,j)$ and $PH_{PUSCH}(i,j)$; $PH'_{PUCCH+PUSCH}(i,j)$ and $PH_{PUSCH}(i,j)$; $PH_{PUCCH+PUSCH}(i,j)$ and $PH_{PUSCH}(i,j)$ and $PH_{PUCCH}(i,j)$; and $PH'_{PUCCH+PUSCH}(i,j)$ and $PH_{PUSCH}(i,j)$ and $PH_{PUCCH}(i,j)$;
in which, i is the subframe, and i is the component carrier group;

$$PH_{PUCCH+PUSCH}(i,j) = 10\log_{10}\left(10^{P_{CMAX}(j)/10} - 10^{P'_{PUCCH}(i,j)/10}\right) - P'_{PUSCH}(i,j)$$

$$= 10\log_{10}\left(\frac{10^{P_{CMAX}(j)/10} - 10^{P'_{PUCCH}(i,j)/10}}{10^{P'_{PUSCH}(i,j)/10}}\right),$$

$$PH'_{PUCCH+PUSCH}(i,j) = P_{CMAX}(j) - 10\log_{10}\left(10^{P'_{PUSCH}(i,j)/10} + 10^{P'_{PUCCH}(i,j)/10}\right)$$

$$= 10\log_{10}\left(\frac{10^{P_{CMAX}(j)/10}}{10^{P'_{PUSCH}(i,j)/10} + 10^{P'_{PUCCH}(i,j)/10}}\right),$$

-continued $$PH_{PUSCH}(i, j) = P_{CMAX}(j) - P'_{PUSCH}(i, j),$$
$$PH_{PUCCH}(i, j) = P''_{CMAX}(j) - P'_{PUCCH}(i, j),$$

in which, $P'_{PUSCH}(i,j)$ is the transmitting power, which is estimated by the terminal, of the PUSCH transmitted on the subframe i and the component carrier group j; $P'_{PUCCH}(i,j)$ is the transmitting power, which is estimated by the terminal, of the PUCCH transmitted on the subframe i and the component carrier group j; and $P_{CMAX}(j)$ is the configured maximum output power, which is set by the terminal, on the subframe i and the component carrier group j; and $P'_{CMAX}(j)=P'''_{CMAX}(j)=P_{CMAX}(j)$ is the configured maximum output power, which is set by the terminal, on the subframe i and the component carrier group j; or $P'_{CMAX}(j)$ is the configured maximum output power on the component carrier group j, which is set by the terminal supposing that there is only the PUSCH transmitted on the component carrier group j; and $P'''_{CMAX}(j)$ is the configured maximum output power on the component carrier group j, which is set by the terminal supposing that there is only the PUCCH transmitted on the component carrier group j.

2. The method according to claim 1, wherein,
supposing that there is only the PUSCH transmitted on the component carrier group j, the transmission configuration of the PUSCH supposed to be sent by the terminal is same as the configuration of the PUSCH transmitted on the subframe i and the component carrier group j; and
supposing that there is only the PUCCH transmitted on the component carrier group j, the transmission configuration of the PUCCH supposed to be sent by the terminal is same as the configuration of the PUCCH transmitted on the subframe i and the component carrier group j;
in which both the transmission configuration of the PUSCH and the transmission configuration of the PUCCH comprise modulation order, transmission bandwidth position and transmission bandwidth configuration;
or,
when the measured power headroom is $PH_{PUCCH+PUSCH}(i,j)$ or $PH'_{PUCCH+PUSCH}(i,j)$, and the terminal has new uplink transmission on the subframe i, and there is an event triggering the reporting of power headroom on the subframe i and the component carrier group j, the terminal reporting the power headroom to the base station comprises:
according to the priority of logical channels, if the uplink resource allocated to the terminal on the subframe i is enough to bear one power headroom media access control (MAC) layer control element which is used for reporting the power headroom on the subframe i and the component carrier group j and the MAC protocol data unit sub-header thereof, then the terminal performing the operation of reporting the power headroom $PH_{PUCCH+PUSCH}(i,j)$ or $PH'_{PUCCH+PUSCH}(i,j)$ on the subframe i;
or,
when the measured power headroom is $PH_{PUCCH+PUSCH}(i,j)$ or $PH'_{PUCCH+PUSCH}(i,j)$ and the terminal has new uplink transmission on the subframe i and the component carrier group j, and there is an event triggering the reporting of power headroom on the subframe i and the component carrier group j, the terminal reporting the power headroom to the base station comprises:
according to the priority of logical channels, if the uplink resource allocated to the terminal on the subframe i and the component carrier group j is enough to bear one power headroom MAC control element which is used for reporting the power headroom on the subframe i and the component carrier group j and the MAC protocol data unit sub-header thereof, then the terminal performing the operation of reporting the power headroom $PH_{PUCCH+PUSCH}(i,j)$ or $PH'_{PUCCH+PUSCH}(i,j)$ on the subframe i and the component carrier group j.

3. The method according to claim 1, wherein when the measured power headroom is $PH_{PUSCH}(i,j)$ and $PH_{PUCCH}(i,j)$, or $PH_{PUCCH+PUSCH}(i,j)$ and $PH_{PUCCH}(i,j)$, or $PH'_{PUCCH+PUSCH}(i,j)$ and $PH_{PUCCH}(i,j)$, or $PH_{PUCCH+PUSCH}(i,j)$ and $PH_{PUSCH}(i,j)$, or $PH'_{PUCCH+PUSCH}(i,j)$ and $PH_{PUSCH}(i,j)$, or $PH_{PUCCH+PUSCH}(i,j)$ and $PH_{PUSCH}(i,j)$ and $PH_{PUCCH}(i,j)$; or $PH'_{PUCCH+PUSCH}(i,j)$ and $PH_{PUSCH}(i,j)$ and $PH_{PUCCH}(i,j)$, and the terminal has new uplink transmission on the subframe i, and there is an event triggering the reporting of power headroom on the subframe i and the component carrier group j, the terminal reporting the power headroom to the base station comprises:
according to the priority of logical channels, if the uplink resource allocated to the terminal on the subframe i is enough to bear two power headroom MAC control elements which are used for reporting the power headroom on the subframe i and the component carrier group j and the MAC protocol data unit sub-header thereof, then the terminal performing the operation of reporting the power headroom on the subframe i; and
according to the priority of logical channels, if the uplink resource allocated to the terminal on the subframe i is enough to bear one power headroom MAC control element which is used for reporting the power headroom on the subframe i and the component carrier group j and the MAC protocol data unit sub-header thereof, then the terminal performing the operation of reporting the power headroom on the subframe i;
or,
when the measured power headroom is $PH_{PUSCH}(i,j)$ and $PH_{PUCCH}(i,j)$, or $PH_{PUCCH+PUSCH}(i,j)$ and $PH_{PUCCH}(i,j)$, or $PH'_{PUCCH+PUSCH}(i,j)$ and $PH_{PUCCH}(i,j)$, or $PH_{PUCCH+PUSCH}(i,j)$ and $PH_{PUSCH}(i,j)$, or $PH'_{PUCCH+PUSCH}(i,j)$ and $PH_{PUSCH}(i,j)$, or $PH_{PUCCH+PUSCH}(i,j)$ and $PH_{PUSCH}(i,j)$ and $PH_{PUCCH}(i,j)$; or $PH'_{PUCCH+PUSCH}(i,j)$ and $PH_{PUSCH}(i,j)$ and $PH_{PUCCH}(i,j)$, and the terminal has new uplink transmission on the subframe i and the component carrier group j, and there is an event triggering the reporting of power headroom on the subframe i and the component carrier group j, the terminal reporting the power headroom to the base station comprises:
according to the priority of logical channels, if the uplink resource allocated to the terminal on the subframe i and the component carrier group j is enough to bear two power headroom MAC control elements which are used for reporting the power headroom on the subframe i and the component carrier group j and the MAC protocol data unit sub-header thereof, then the terminal performing the operation of reporting the power headroom on the subframe i and the component carrier group j; and
according to the priority of logical channels, if the uplink resource allocated to the terminal on the subframe i and the component carrier group j is enough to bear one power headroom MAC control element which is used for reporting the power headroom on the subframe i and the component carrier group j and the MAC protocol data unit sub-header thereof, then the terminal performing the operation of reporting the power headroom on the subframe i and the component carrier group j.

4. The method according to claim 3, wherein when the uplink resource allocated to the terminal is enough to bear two power headroom MAC control elements which are used for reporting the power headroom on the subframe i and the component carrier group j and the MAC protocol data unit sub-header thereof, the terminal reporting the power headroom to the base station further comprises:

when the measured power headroom is $PH_{PUCCH+PUSCH}(i,j)$ and $PH_{PUSCH}(i,j)$ and $PH_{PUCCH}(i,j)$, the power headroom on the subframe i and the component carrier group j which is reported by the terminal on the subframe i being $PH_{PUSCH}(i,j)$ and $PH_{PUCCH}(i,j)$, or $PH_{PUCCH+PUSCH}(i,j)$ and $PH_{PUSCH}(i,j)$, or $PH_{PUCCH+PUSCH}(i,j)$ and $PH_{PUCCH}(i,j)$; and when the measured power headroom is $PH'_{PUCCH+PUSCH}(i,j)$ and $PH_{PUSCH}(i,j)$ and $PH_{PUCCH}(i,j)$, the power headroom on the subframe i and the component carrier group j which is reported by the terminal on the subframe i being $PH_{PUSCH}(i,k)$ and $PH_{PUCCH}(i,k)$, or $PH'_{PUCCH+PUSCH}(i,k)$ and $PH_{PUSCH}(i,k)$, or $PH'_{PUCCH+PUSCH}(i,k)$ and $PH_{PUCCH}(i,k)$.

5. The method according to claim 4, wherein the way of the terminal determining the reported power headroom on the subframe i and the component carrier group j comprises:

when the measured power headroom is $PH_{PUCCH+PUSCH}(i,j)$ and $PH_{PUSCH}(i,j)$ and $PH_{PUCCH}(i,j)$, when $PH_{PUCCH+PUSCH}(i,j) \geq 0$ or $PH_{PUCCH+PUSCH}(i,j) > 0$, the power headroom on the subframe i and the component carrier group j which is reported by the terminal on the subframe i is $PH_{PUSCH}(i,j)$ and $PH_{PUCCH}(i,j)$; and when $PH_{PUCCH+PUSCH}(i,j) < 0$ or $PH_{PUCCH+PUSCH}(i,j) \leq 0$, the power headroom on the subframe i and the component carrier group j which is reported by the terminal on the subframe i is $PH_{PUCCH+PUSCH}(i,j)$ and $PH_{PUSCH}(i,j)$, or $PH_{PUCCH+PUSCH}(i,j)$ and $PH_{PUCCH}(i,j)$; or when $PH_{PUCCH+PUSCH}(i,j) \geq 0$ or $PH_{PUCCH+PUSCH}(i,j) > 0$, the power headroom on the subframe i and the component carrier group j which is reported by the terminal on the subframe i is $PH_{PUCCH+PUSCH}(i,j)$ and $PH_{PUSCH}(i,j)$, or $PH_{PUCCH+PUSCH}(i,j)$ and $PH_{PUCCH}(i,j)$; and when $PH_{PUCCH+PUSCH}(i,j) < 0$ or $PH_{PUCCH+PUSCH}(i,j) \leq 0$, the power headroom on the subframe i and the component carrier group j which is reported by the terminal on the subframe i is $PH_{PUSCH}(i,j)$ and $PH_{PUCCH}(i,j)$; and when the measured power headroom is $PH'_{PUCCH+PUSCH}(i,j)$ and $PH_{PUSCH}(i,j)$ and $PH_{PUCCH}(i,j)$, when $PH'_{PUCCH+PUSCH}(i,j) \geq 0$ or $PH'_{PUCCH+PUSCH}(i,j) > 0$, the power headroom on the subframe i and the component carrier group j which is reported by the terminal on the subframe i is $PH'_{PUCCH+PUSCH}(i,j)$ and $PH_{PUSCH}(i,j)$, or $PH'_{PUCCH+PUSCH}(i,j)$ and $PH_{PUCCH}(i,j)$; and when $PH'_{PUCCH+PUSCH}(i,j) < 0$ or $PH'_{PUCCH+PUSCH}(i,j) \leq 0$, the power headroom on the subframe i and the component carrier group j which is reported by the terminal on the subframe i is $PH_{PUSCH}(i,j)$ and $PH_{PUCCH}(i,j)$; or when $PH'_{PUCCH+PUSCH}(i,j) \geq 0$ or $PH'_{PUCCH+PUSCH}(i,j) > 0$, the power headroom on the subframe i and the component carrier group j which is reported by the terminal on the subframe i is $PH_{PUSCH}(i,j)$ and $PH_{PUCCH}(i,j)$; and when $PH'_{PUCCH+PUSCH}(i,j) < 0$ or $PH'_{PUCCH+PUSCH}(i,j) \leq 0$, the power headroom on the subframe i and the component carrier group j which is reported by the terminal on the subframe i is $PH'_{PUCCH+PUSCH}(i,j)$ and $PH_{PUSCH}(i,j)$, or $PH'_{PUCCH+PUSCH}(i,j)$ and $PH_{PUCCH}(i,j)$.

6. The method according to claim 3, wherein when the uplink resource allocated to the terminal is enough to bear one power headroom MAC control element which is used for reporting the power headroom on the subframe i and the component carrier group j and the MAC protocol data unit sub-header thereof, the terminal reporting the power headroom to the base station further comprises:

when the measured power headroom is $PH_{PUCCH+PUSCH}(i,j)$ and $PH_{PUCCH}(i,j)$, the power headroom on the subframe i and the component carrier group j which is reported by the terminal on the subframe i is $PH_{PUCCH+PUSCH}(i,j)$ or $PH_{PUCCH}(i,j)$;

when the measured power headroom is $PH'_{PUCCH+PUSCH}(i,j)$ and $PH_{PUCCH}(i,j)$, the power headroom on the subframe i and the component carrier group j which is reported by the terminal on the subframe i is $PH'_{PUCCH+PUSCH}(i,j)$ or $PH_{PUCCH}(i,j)$;

when the measured power headroom is $PH_{PUCCH+PUSCH}(i,j)$ and $PH_{PUSCH}(i,j)$, the power headroom on the subframe i and the component carrier group j which is reported by the terminal on the subframe i is $PH_{PUCCH+PUSCH}(i,j)$ or $PH_{PUSCH}(i,j)$;

when the measured power headroom is $PH'_{PUCCH+PUSCH}(i,j)$ and $PH_{PUSCH}(i,j)$, the power headroom on the subframe i and the component carrier group j which is reported by the terminal on the subframe i is $PH'_{PUCCH+PUSCH}(i,j)$ or $PH_{PUSCH}(i,j)$;

when the measured power headroom is $PH_{PUCCH+PUSCH}(i,j)$ and $PH_{PUSCH}(i,j)$ and $PH_{PUCCH}(i,j)$, the power headroom on the subframe i and the component carrier group j which is reported by the terminal on the subframe i is $PH_{PUCCH+PUSCH}(i,j)$ or $PH_{PUSCH}(i,j)$ or $PH_{PUCCH}(i,j)$; and when the measured power headroom is $PH'_{PUCCH+PUSCH}(i,j)$ and $PH_{PUSCH}(i,j)$ and $PH_{PUCCH}(i,j)$, the power headroom on the subframe i and the component carrier group j which is reported by the terminal on the subframe i is $PH'_{PUCCH+PUSCH}(i,j)$ or $PH_{PUSCH}(i,j)$ or $PH_{PUCCH}(i,j)$.

7. The method according to claim 6, wherein the way of the terminal determining the reported power headroom on the subframe i and the component carrier group j comprises:

when the measured power headroom is $PH_{PUCCH+PUSCH}(i,j)$ and $PH_{PUCCH}(i,j)$, when $PH_{PUCCH+PUSCH}(i,j) \geq 0$ or $PH_{PUCCH+PUSCH}(i,j) > 0$, the power headroom on the subframe i and the component carrier group j which is reported by the terminal on the subframe i is $PH_{PUCCH+PUSCH}(i,j)$; and when $PH_{PUCCH+PUSCH}(i,j) < 0$ or $PH_{PUCCH+PUSCH}(i,j) \leq 0$, the power headroom on the subframe i and the component carrier group j which is reported by the terminal on the subframe i is $PH_{PUCCH}(i,j)$; or when $PH_{PUCCH+PUSCH}(i,j) \geq 0$ or $PH_{PUCCH+PUSCH}(i,j) > 0$, the power headroom on the subframe i and the component carrier group j which is reported by the terminal on the subframe i is $PH_{PUCCH}(i,j)$; and when $PH_{PUCCH+PUSCH}(i,j) < 0$ or $PH_{PUCCH+PUSCH}(i,j) \leq 0$, the power headroom on the subframe i and the component carrier group j which is reported by the terminal on the subframe i is $PH_{PUCCH+PUSCH}(i,j)$;

when the measured power headroom is $PH'_{PUCCH+PUSCH}(i,j)$ and $PH_{PUCCH}(i,j)$, when $PH'_{PUCCH+PUSCH}(i,j) \geq 0$ or $PH'_{PUCCH+PUSCH}(i,j) > 0$, the power headroom on the subframe i and the component carrier group j which is reported by the terminal on the subframe i is $PH'_{PUCCH+PUSCH}(i,j)$; and when $PH'_{PUCCH+PUSCH}(i,j) < 0$ or $PH'_{PUCCH+PUSCH}(i,j) \leq 0$, the power headroom on the subframe i and the component carrier group j which is reported by the terminal on the subframe i is $PH_{PUCCH}(i,j)$; or when $PH'_{PUCCH+PUSCH}(i,j) \geq 0$ or $PH'_{PUCCH+PUSCH}(i,j) > 0$, the power headroom on the subframe i and the component carrier group j which is reported by the terminal on the subframe i is $PH_{PUCCH+PUSCH}(i,j)$; and when $PH'_{PUCCH+PUSCH}(i,j) < 0$ or $PH'_{PUCCH+PUSCH}(i,j) \leq 0$, the power headroom on the subframe i and the component carrier group j which is reported by the terminal on the subframe i is $PH'_{PUCCH+PUSCH}(i,j)$;

when the measured power headroom is $PH_{PUCCH+PUSCH}(i,j)$ and $PH_{PUSCH}(i,j)$, when $PH_{PUCCH+PUSCH}(i,j) \geq 0$ or $PH_{PUCCH+PUSCH}(i,j) > 0$, the power headroom on the subframe i and the component carrier group j which is reported by the terminal on the subframe i is $PH_{PUSCH}(i,j)$; and when $PH_{PUCCH+PUSCH}(i,j) < 0$ or $PH_{PUCCH+PUSCH}(i,j) \leq 0$, the power headroom on the subframe i and the component carrier group j which is reported by the terminal on the subframe i is $PH_{PUCCH+PUSCH}(i,j)$; or when $PH_{PUCCH+PUSCH}(i,j) \geq 0$ or $PH_{PUCCH+PUSCH}(i,j) > 0$, the power headroom on the subframe i and the component carrier group j which is reported by the terminal on the subframe i is $PH_{PUCCH+PUSCH}(i,j)$; and when $PH_{PUCCH+PUSCH}(i,j) < 0$ or $PH_{PUCCH+PUSCH}(i,j) \leq 0$, the power headroom on the subframe i and the component carrier group j which is reported by the terminal on the subframe i is $PH_{PUSCH}(i,j)$;

when the measured power headroom is $PH'_{PUCCH+PUSCH}(i,j)$ and $PH_{PUSCH}(i,j)$, when $PH'_{PUCCH+PUSCH}(i,j) \geq 0$ or $PH'_{PUCCH+PUSCH}(i,j) > 0$, the power headroom on the subframe i and the component carrier group j which is reported by the terminal on the subframe i is $PH_{PUSCH}(i,j)$; and when $PH'_{PUCCH+PUSCH}(i,j) < 0$ or $PH'_{PUCCH+PUSCH}(i,j) \leq 0$, the power headroom on the subframe i and the component carrier group j which is reported by the terminal on the subframe i is $PH'_{PUCCH+PUSCH}(i,j)$; or when $PH'_{PUCCH+PUSCH}(i,j) \geq 0$ or $PH'_{PUCCH+PUSCH}(i,j) > 0$, the power headroom on the subframe i and the component carrier group j which is reported by the terminal on the subframe i is $PH'_{PUCCH+PUSCH}(i,j)$; and when $PH'_{PUCCH+PUSCH}(i,j) < 0$ or $PH'_{PUCCH+PUSCH}(i,j) \leq 0$, the power headroom on the subframe i and the component carrier group j which is reported by the terminal on the subframe i is $PH_{PUSCH}(i,j)$;

when the measured power headroom is $PH_{PUCCH+PUSCH}(i,j)$ and $PH_{PUSCH}(i,j)$ and $PH_{PUCCH}(i,j)$, when $PH_{PUCCH+PUSCH}(i,j) \geq 0$ or $PH_{PUCCH+PUSCH}(i,j) > 0$, or the power headroom on the subframe i and the component carrier group j which is reported by the terminal on the subframe i is $PH_{PUSCH}(i,j)$ or $PH_{PUCCH}(i,j)$; and when $PH_{PUCCH+PUSCH}(i,j) < 0$ or $PH_{PUCCH+PUSCH}(i,j) \leq 0$, the power headroom on the subframe i and the component carrier group j which is reported by the terminal on the subframe i is $PH_{PUCCH+PUSCH}(i,j)$; or when $PH_{PUCCH+PUSCH}(i,j) \geq 0$ or $PH_{PUCCH+PUSCH}(i,j) > 0$, the power headroom on the subframe i and the component carrier group j which is reported by the terminal on the subframe i is $PH_{PUCCH+PUSCH}(i,j)$; and when $PH_{PUCCH+PUSCH}(i,j) < 0$ or $PH_{PUCCH+PUSCH}(i,j) \leq 0$, the power headroom on the subframe i and the component carrier group j which is reported by the terminal on the subframe i is $PH_{PUSCH}(i,j)$ or $PH_{PUCCH}(i,j)$;

and when the measured power headroom is $PH'_{PUCCH+PUSCH}(i,j)$ and $PH_{PUSCH}(i,j)$ and $PH_{PUCCH}(i,j)$, when $PH'_{PUCCH+PUSCH}(i,j) \geq 0$ or $PH'_{PUCCH+PUSCH}(i,j) > 0$, the power headroom on the subframe i and the component carrier group j which is reported by the terminal on the subframe i is $PH'_{PUCCH+PUSCH}(i,j)$; and when $PH'_{PUCCH+PUSCH}(i,j) < 0$ or $PH'_{PUCCH+PUSCH}(i,j) \leq 0$, the power headroom on the subframe i and the component carrier group j which is reported by the terminal on the subframe i is $PH_{PUSCH}(i,j)$ or $PH_{PUCCH}(i,j)$; or when $PH'_{PUCCH+PUSCH}(i,j) \geq 0$ or $PH'_{PUCCH+PUSCH}(i,j) > 0$, the power headroom on the subframe i and the component carrier group j which is reported by the terminal on the subframe i is $PH_{PUSCH}(i,j)$ or $PH_{PUCCH}(i,j)$; and when $PH'_{PUCCH+PUSCH}(i,j) < 0$ or $PH'_{PUCCH+PUSCH}(i,j) \leq 0$, the power headroom on the subframe i and the component carrier group j which is reported by the terminal on the subframe i is $PH'_{PUCCH+PUSCH}(i,j)$.

8. The method according to claim 3, wherein the type and the number of the power headroom(s) on the subframe i and the component carrier group j which is reported by the terminal are configured by the higher layer signalling.

9. The method according to claim 1, wherein when the terminal only transmits the PUSCH on the subframe i and the component carrier group j, and the terminal has new uplink transmission on the subframe i, and there is an event triggering the reporting of power headroom on the subframe i and the component carrier group j, the terminal reporting the power headroom to the base station comprises:

according to the priority of logical channels, if the uplink resource allocated to the terminal on the subframe i is enough to bear one power headroom MAC control element which is used for reporting the power headroom on the subframe i and the component carrier group j and the MAC protocol data unit sub-header thereof, then the terminal performs the operation of reporting the power headroom on the subframe i;

or, when the terminal only transmits the PUSCH on the subframe i and the component carrier group j, and the terminal has new uplink transmission on the subframe i and the component carrier group j, and there is an event triggering the reporting of power headroom on the subframe i and the component carrier group j, the terminal reporting the power headroom to the base station comprises:

according to the priority of logical channels, if the uplink resource allocated to the terminal on the subframe i and the component carrier group j is enough to bear one power headroom MAC control element which is used for reporting the power headroom on the subframe i and the component carrier group j and the MAC protocol data unit sub-header thereof, then the terminal performing the operation of reporting the power headroom on the subframe i and the component carrier group j;

or, when the terminal only transmits the PUCCH on the subframe i and the component carrier group j, and the terminal has new uplink transmission on a subframe i+n, and there is an event triggering the reporting of power headroom on the subframe i and the component carrier group j, the terminal reporting the power headroom to the base station comprises:

according to the priority of logical channels, if the uplink resource allocated to the terminal on the subframe i+n is enough to bear one power headroom MAC control element which is used for reporting the power headroom on the subframe i and the component carrier group j and the MAC protocol data unit sub-header thereof, then the terminal performing the operation of reporting the power headroom on the subframe i;

in which the subframe i+n is the first subframe on which the terminal has new uplink transmission, after the subframe i;

or, when the terminal only transmits the PUCCH on the subframe i and the component carrier group j, and the terminal has new uplink transmission on a subframe i+n and the component carrier group j, and there is an event triggering the reporting of power headroom on the subframe i and the component carrier group j, the terminal reporting the power headroom to the base station comprises:

according to the priority of logical channels, if the uplink resource allocated to the terminal on the subframe i+n and the component carrier group j is enough to bear one power headroom MAC control element which is used for reporting the power headroom on the subframe i and the component carrier group j and the MAC protocol data unit sub-header thereof, then the terminal performing the operation of reporting the power headroom on the subframe i and the component carrier group j;

in which the subframe i+n is the first subframe on which the terminal has new uplink transmission on the component carrier group j, after the subframe i.

10. The method according to claim 9, wherein the step of the terminal reporting the power headroom to a base station and indicating the type of the reported power headroom when reporting comprises:

the terminal reporting the power headroom and the type of the power headroom to the base station through the power headroom MAC control element.

11. The method according to claim 10, wherein the highest bit and/or the secondarily highest bit of the power headroom MAC control element are used for indicating the type of the reported power headroom.

12. The method according to claim 9, wherein the component carrier group includes only one component carrier; or the component carrier group includes all the component carriers using the same power amplifier at the terminal; or the component carrier group includes all component carriers which the terminal can support.

13. The method according to claim 1, wherein the step of the terminal reporting the power headroom to a base station and indicating the type of the reported power headroom when reporting comprises:

the terminal reporting the power headroom and the type of the power headroom to the base station through the power headroom MAC control element.

14. The method according to claim 13, wherein the highest bit and/or the secondarily highest bit of the power headroom MAC control element are used for indicating the type of the reported power headroom.

15. The method according to claim 1, wherein the component carrier group includes only one component carrier; or the component carrier group includes all the component carriers using the same power amplifier at the terminal; or the component carrier group includes all component carriers which the terminal can support.

16. The method according to claim 1, wherein the step of the terminal reporting the power headroom to a base station and indicating the type of the reported power headroom when reporting comprises:

the terminal reporting the power headroom and the type of the power headroom to the base station through the power headroom MAC control element.

17. The method according to claim 16, wherein the highest bit and/or the secondarily highest bit of the power headroom MAC control element are used for indicating the type of the reported power headroom.

18. The method according to claim 1, wherein the component carrier group includes only one component carrier; or the component carrier group includes all the component carriers using the same power amplifier at the terminal; or the component carrier group includes all component carriers which the terminal can support.

19. A terminal, comprising:

a measuring module, configured for measuring a power headroom on a subframe and a component carrier group, when transmitting a physical uplink shared channel (PUSCH) and/or a physical uplink control channel (PUCCH) on the subframe and the component carrier group; and a transmitting module, configured for reporting the power headroom to a base station and indicating the type of the reported power headroom while reporting;

wherein the measured power headroom on the subframe and the component carrier group is one of:

$PH_{PUCCH+PUSCH}(i,j)$; $PH'_{PUCCH+PUSCH}(i,j)$; $PH_{PUSCH}(i,j)$ and $PH_{PUCCH}(i,j)$; $PH_{PUCCH+PUSCH}(i,j)$ and $PH_{PUCCH}(i,j)$; $PH'_{PUCCH+PUSCH}(i,j)$ and $PH_{PUCCH}(i,j)$; $PH_{PUCCH+PUSCH}(i,j)$ and $PH_{PUSCH}(i,j)$; $PH'_{PUCCH+PUSCH}(i,j)$ and $PH_{PUSCH}(i,j)$;

$PH_{PUCCH+PUSCH}(i,j)$ and $PH_{PUSCH}(i,j)$ and $PH_{PUCCH}(i,j)$; and $PH'_{PUCCH+PUSCH}(i,j)$ and $PH_{PUSCH}(i,j)$ and $PH_{PUCCH}(i,j)$;

in which, i is the subframe, and j is the component carrier group;

$$PH_{PUCCH+PUSCH}(i,j) = 10\log_{10}\left(10^{P_{CMAX}(j)/10} - 10^{P'_{PUCCH}(i,j)/10}\right) - P'_{PUCCH}(i,j)$$

$$= 10\log_{10}\left(\frac{10^{P_{CMAX}(j)/10} - 10^{P'_{PUCCH}(i,j)/10}}{10^{P'_{PUSCH}(i,j)/10}}\right),$$

$$PH'_{PUCCH+PUSCH}(i,j) = P_{CMAX}(j) -$$
$$10\log_{10}\left(10^{P'_{PUSCH}(i,j)/10} - 10^{P'_{PUCCH}(i,j)/10}\right)$$

$$= 10\log_{10}\left(\frac{10^{P_{CMAX}(j)/10}}{10^{P'_{PUSCH}(i,j)/10} + 10^{P'_{PUCCH}(i,j)/10}}\right),$$

$$PH_{PUSCH}(i,j) = P'_{CMAX}(j) - P'_{PUSCH}(i,j),$$

$$PH_{PUCCH}(i,j) = P''_{CMAX}(j) - P'_{PUCCH}(i,j),$$

in which, $P'_{PUSCH}(i,j)$ is the transmitting power, which is estimated by the terminal, of the PUSCH transmitted on the subframe i and the component carrier group j; $P'_{PUCCH}(i,j)$ is the transmitting power, which is estimated by the terminal, of the PUCCH transmitted on the subframe i and the component carrier group j; and $P_{CMAX}(j)$ is the configured maximum output power, which is set by the terminal, on the subframe i and the component carrier group j; and $P'_{CMAX}(j)=P''_{CMAX}(j)=P_{CMAX}(j)$ is the configured maximum output power, which is set by the terminal, on the subframe i and the component carrier group j; or $P'_{CMAX}(j)$ is the configured maximum output power on the component carrier group j, which is set by the terminal supposing that there is only the PUSCH transmitted on the component carrier group j; and $P''_{CMAX}(j)$ is the configured maximum output power on the component carrier group j, which is set by the terminal supposing that there is only the PUCCH transmitted on the component carrier group j.

* * * * *